(12) United States Patent
Harriman et al.

(10) Patent No.: US 11,321,264 B2
(45) Date of Patent: May 3, 2022

(54) FLATTENING PORTAL BRIDGE

(71) Applicant: Intel Corporation, Santa Clara, CA (US)

(72) Inventors: David J. Harriman, Portland, OR (US); Reuven Rozic, Binyamina (IL); Maxim Dan, Haifa (IL); Prashant Sethi, Folsom, CA (US); Robert E. Gough, Sherwood, OR (US); Shanthanand Kutuva Rabindranath, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/136,347

(22) Filed: Dec. 29, 2020

(65) Prior Publication Data

US 2021/0232522 A1 Jul. 29, 2021

Related U.S. Application Data

(62) Division of application No. 15/281,318, filed on Sep. 30, 2016, now Pat. No. 10,877,915.

(Continued)

(51) Int. Cl.
*G06F 13/40* (2006.01)
*G06F 13/42* (2006.01)

(52) U.S. Cl.
CPC ........ *G06F 13/404* (2013.01); *G06F 13/4022* (2013.01); *G06F 13/4068* (2013.01);
(Continued)

(58) Field of Classification Search
None
See application file for complete search history.

(56) References Cited

U.S. PATENT DOCUMENTS 6,324,609 B1 * 11/2001 Davis ................ G06F 13/4027
710/119
6,700,877 B1 * 3/2004 Lorenz ................ H04L 12/403
370/254

(Continued)

FOREIGN PATENT DOCUMENTS

TW 201732620 9/2017
TW 201732620 A 9/2017
WO 2017151267 9/2017

OTHER PUBLICATIONS

TW Search Report dated Sep. 24, 2020, issued to TW Patent Application No. 106101848, including English reporting letter, 4 pages.

(Continued)

*Primary Examiner* — Elias Mamo
(74) *Attorney, Agent, or Firm* — Spectrum IP Law Group LLC

(57) ABSTRACT

A flattening portal bridge (FPB) is provided to support addressing according to a first addressing scheme and a second, alternative addressing scheme. The FPB comprises a primary side and a secondary side, the primary side connects to a first set of devices addressed according to a first addressing scheme, and the secondary side connects to a second set of devices addressed according to a second addressing scheme. The first addressing scheme uses a unique bus number within a Bus/Device/Function (BDF) address space for each device in the first set of devices, and the second bus addressing scheme uses a unique bus-device number for each device in the second set of devices.

20 Claims, 12 Drawing Sheets

Related U.S. Application Data

(60) Provisional application No. 62/303,487, filed on Mar. 4, 2016.

(52) U.S. Cl.
CPC ...... *G06F 13/4221* (2013.01); *G06F 13/4282* (2013.01); *G06F 2213/0024* (2013.01); *G06F 2213/0026* (2013.01)

(56) References Cited

U.S. PATENT DOCUMENTS

| | | | | |
|---|---|---|---|---|
| 7,328,286 | B2* | 2/2008 | Vinnemann | H04L 12/403 710/113 |
| 7,428,523 | B2 | 9/2008 | Tsang et al. | |
| 7,447,827 | B2 | 11/2008 | Chen et al. | |
| 7,626,418 | B1* | 12/2009 | Kolze | H03K 19/17732 326/39 |
| 7,752,346 | B2 | 7/2010 | Talayco et al. | |
| 7,756,014 | B1 | 7/2010 | Norrie | |
| 8,782,321 | B2* | 7/2014 | Harriman | G06F 13/4022 710/316 |
| 9,106,664 | B2 | 8/2015 | Keller | |
| 9,355,031 | B2* | 5/2016 | Bayer | G06F 13/4282 |
| 2008/0263248 | A1 | 10/2008 | Harriman | |
| 2011/0320759 | A1 | 12/2011 | Craddock et al. | |
| 2013/0151750 | A1 | 6/2013 | Kanigicherla | |
| 2015/0269088 | A1 | 9/2015 | Craddock et al. | |
| 2015/0293873 | A1 | 10/2015 | Shao | |

OTHER PUBLICATIONS

PCI-SIG Engineering Change Notice "Flattening Portal Bridge," Notice, Feb. 9, 2017, 30 pages.

PCI Express, "PCI Express Base Specification," Specification, Sep. 27, 2017, Revision 4.0 Version 1.0, 1293 pages.

International Search Report and Written Opinion in International Application No. PCT/US2017/016302 dated May 18, 2017, 10 pages.

Foreign Associate's letter dated Apr. 1, 2021 forwarding an Official Letter issued by the Taiwanese (R.O.C.) Patent Office on Mar. 25, 2021 for corresponding Taiwanese (R.O.C.) Patent Application No. 106101848, 1 page.

Official Letter issued by the Taiwanese (R.O.C.) Patent Office on Mar. 25, 2021 for corresponding Taiwanese (R.O.C.) Patent Application No. 106101848, 2 pages.

Foreign Associate's letter dated Apr. 7, 2021 discussing, in detail, the issue raised in the Official Letter issued by the Taiwanese (R.O.C.) Patent Office on Mar. 25, 2021 for corresponding Taiwanese (R.O.C.) Patent Application No. 106101848, 2 pages.

Foreign Associate's letter dated Jul. 6, 2021 forwarding a Notice of Allowance dated Jun. 25, 2021 issued for corresponding Taiwanese Patent Application No. 106101848.

PCI Express, "PCI Express Base Specification," Specification, Sep. 27, 2017, 1293 pages, Revision 4.0 Version.

TW Search Report dated Sep. 24, 2020, issued to TW Patent Application No. 106101848.

\* cited by examiner

| 31 | 20 | 19 | 0 |
|---|---|---|---|
| Address (MB units) | | Address within MB | |
| Address 1 MB Granularity | | Address within MB | |
| Address 2 MB Granularity | | Address within MB | |
| Address 4 MB Granularity | | Address within MB | |
| Address 8 MB Granularity | | Address within MB | |
| Address 16 MB Granularity | | Address within MB | |

*FIG. 10*

FLATTENING PORTAL BRIDGE

This application is a divisional of and claims benefit from U.S. patent application Ser. No. 15/281,381, filed Sep. 30, 2016, which claims benefit to U.S. Provisional Patent Application Ser. No. 62/303,487, filed Mar. 4, 2016, all of which are hereby incorporated herein in their entirety.

FIELD

This disclosure pertains to computing system, and in particular (but not exclusively) to address space mapping.

BACKGROUND

Peripheral Component Interconnect (PCI) configuration space is utilized by systems employing PCI, PCI-X, and PCI Express (PCIe) to perform configuration tasks of PCI-based devices. PCI-based devices have an address space for device configuration registers referred to as configuration space and PCI Express introduces extended configuration space for devices. Configuration space registers are typically mapped to memory mapped input/output locations by the host processor. Device drivers, operating systems, and diagnostic software access the configuration space and can read and write information to configuration space registers.

One of the improvements the PCI Local Bus had over other I/O architectures was its configuration mechanism. In addition to the normal memory-mapped and I/O port spaces, each device function on the bus has a configuration space, which is 256 bytes long, addressable by knowing the eight-bit PCI bus, five-bit device, and three-bit function numbers for the device (commonly referred to as the BDF or B/D/F, as abbreviated from bus/device/function). This allows up to 256 buses, each with up to 32 devices, each supporting eight functions. A single PCI expansion card can respond as a device and can implement at least function number zero. The first 64 bytes of configuration space are standardized; the remainder are available specification defined extensions and/or for vendor-defined purposes.

In order to allow more parts of configuration space to be standardized without conflicting with existing uses, there can be a list of capabilities defined within the upper 192 bytes of Peripheral Component Interface configuration space. Each capability has one byte that describes which capability it is, and one byte to point to the next capability. The number of additional bytes depends on the capability ID. If capabilities are being used, a bit in the Status register is set, and a pointer to the first in a linked list of capabilities is provided. Versions of PCIe have been provided with similar features, including an extended configuration space expanding the total size of configuration space to 4096 bytes, and such as a PCIe extended capabilities structure.

BRIEF DESCRIPTION OF THE DRAWINGS

FIG. 10 illustrates the layout of addresses in the memory address space below 4 GB to which the FPB MEM Low mechanism applies and the effect of granularity on these addresses.

DETAILED DESCRIPTION

Figure 1:
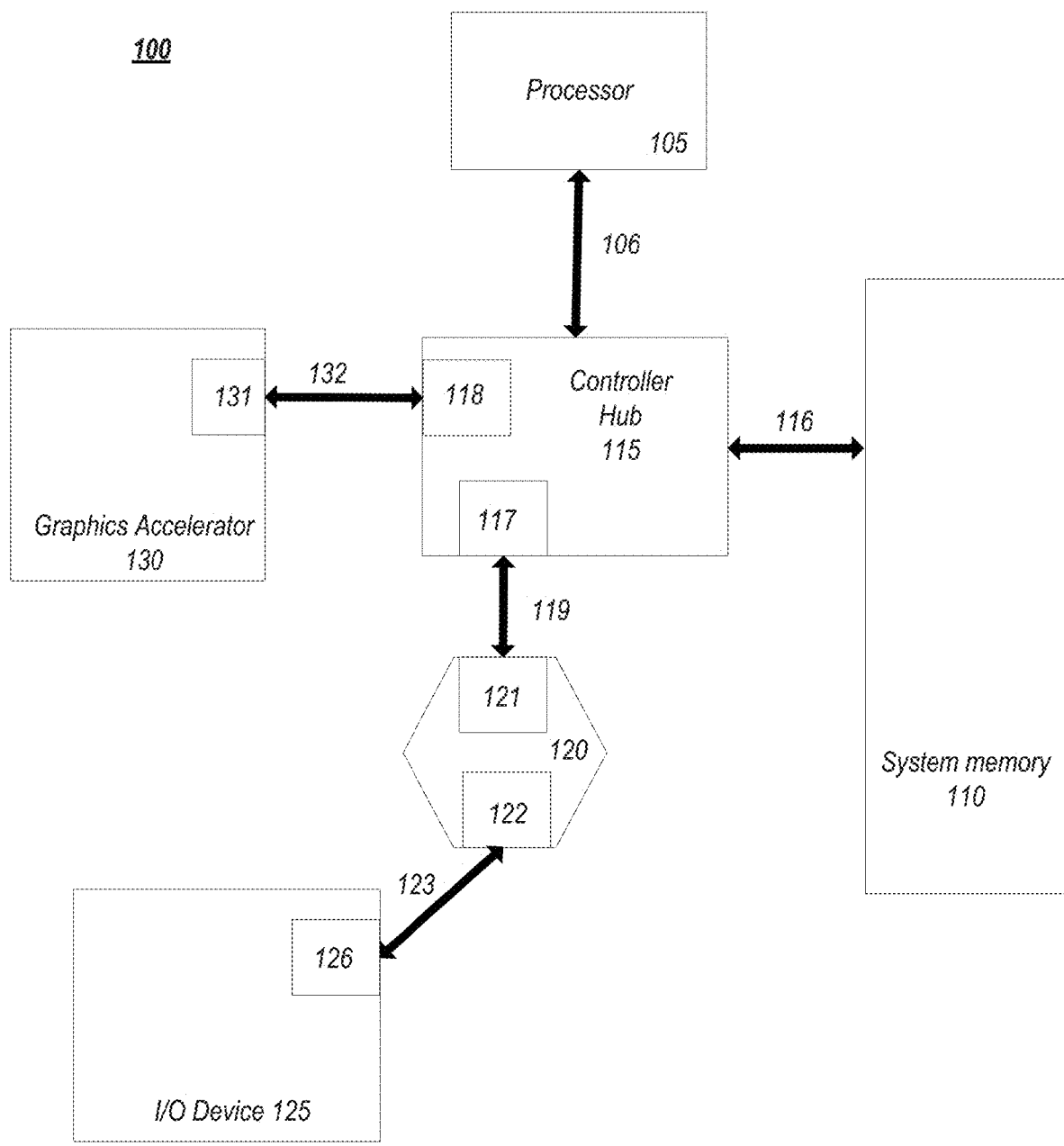
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
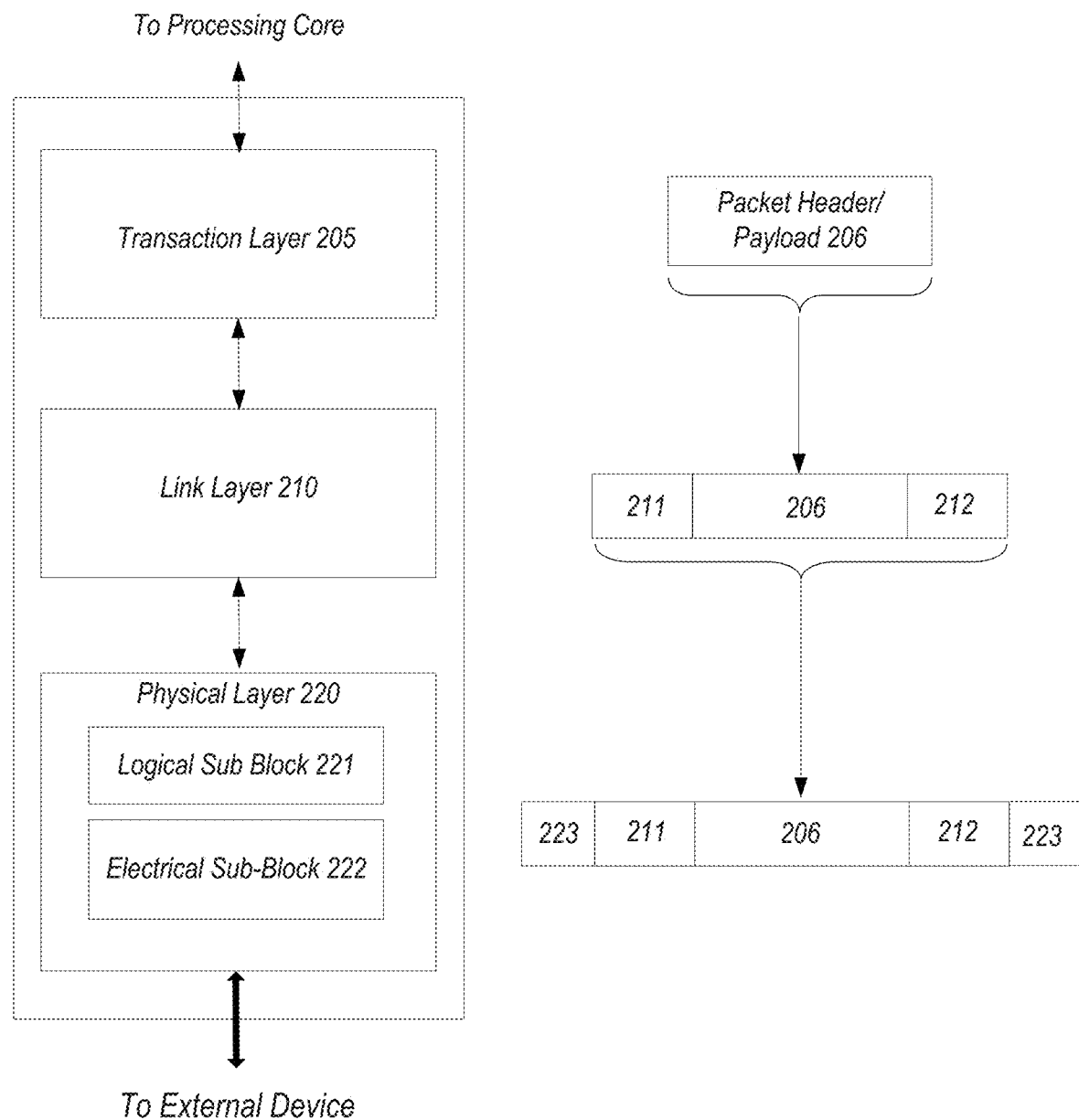
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
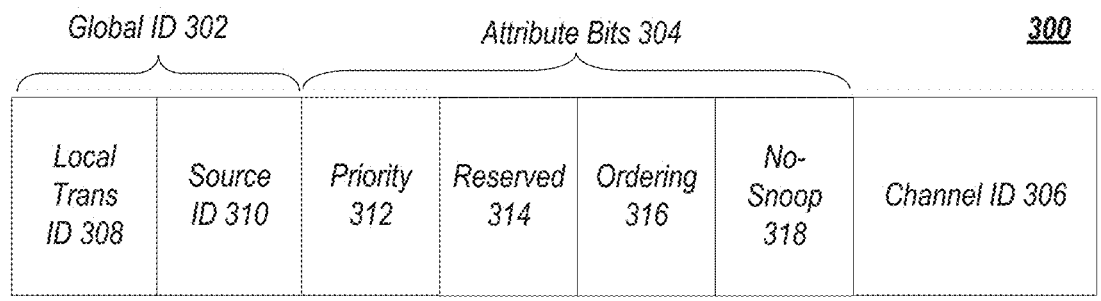
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
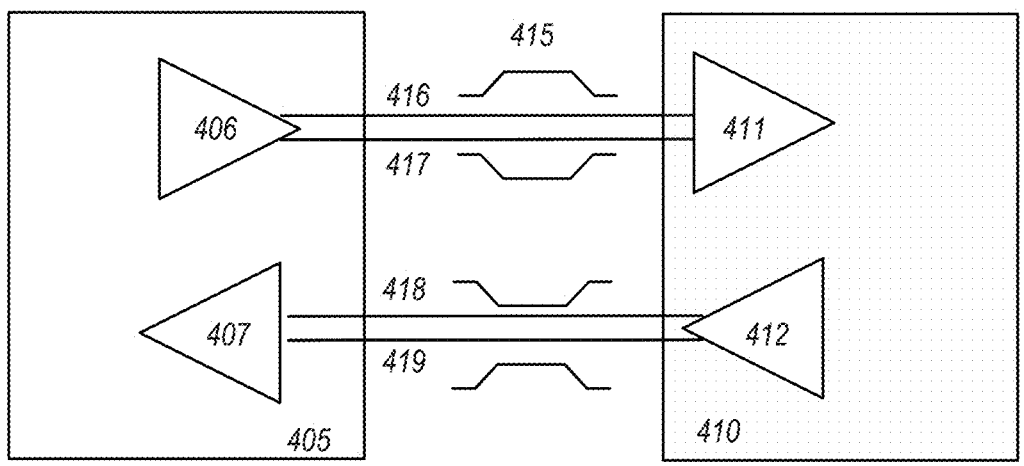
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

New and growing use models, such as PCIe-based storage arrays and Thunderbolt, are driving a significant increase in PCIe hierarchy depth and width. The PCI Express (PCIe) architecture was based on PCI, which defines a "Configuration Space" in which system firmware and/or software discover Functions and enable/disable/control them. The addressing within this space is based on a 16 bit address (commonly referred to as the "BDF", or bus-device-function number) consisting of an 8 bit Bus Number, a 5 bit Device Number, and a 3 bit Function Number. In PCIe the Bus Number can refer to a logical, rather than a physical bus. In addition to being used for to address PCI Functions in Configuration space, and to identify specific Functions for purposes such as error reporting and IO Virtualization, the space, itself, can be considered a type of resource which is subject to issues of allocation and management similar to other resources.

Figure 5:
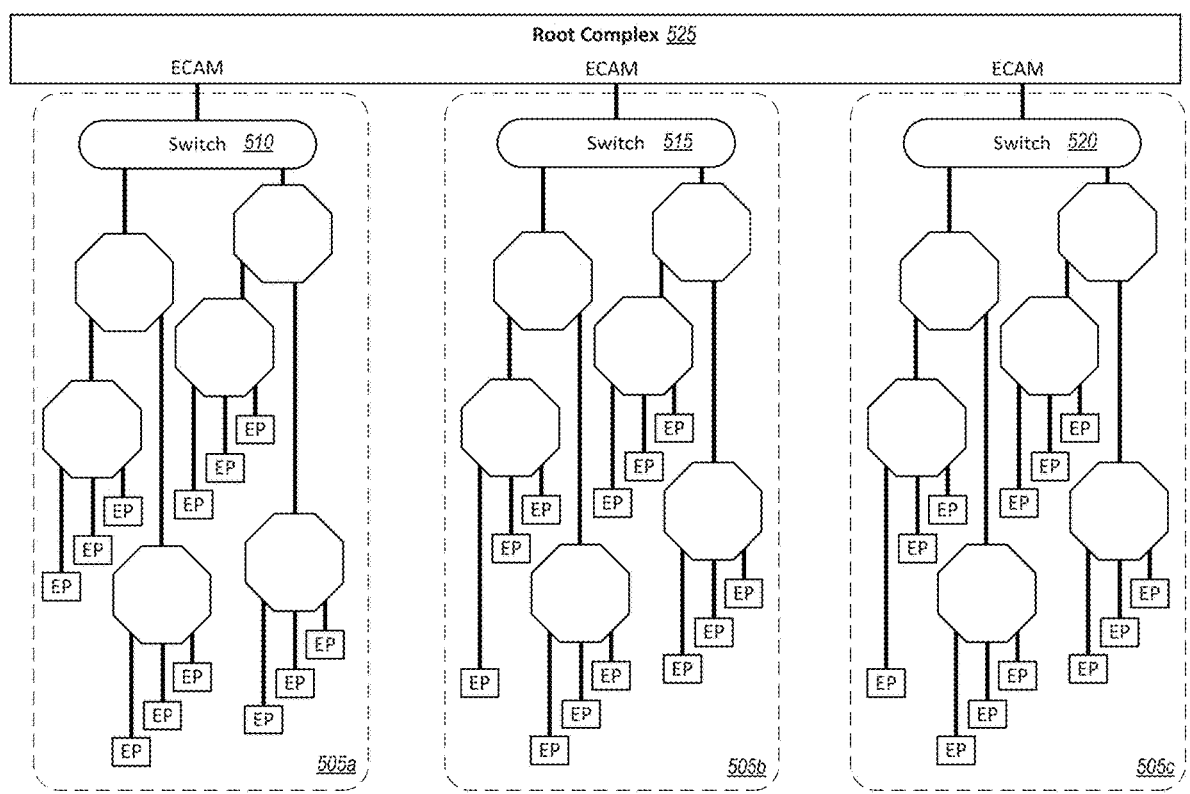
FIG. 5 illustrates a representation of system buses.

PCI allows systems to provide for multiple, independent BDF spaces, which are called "Segments". Each Segment may have certain resource requirements, such as a mechanism for generating PCI/PCIe Configuration Requests, including the Enhanced Configuration Access Mechanism (ECAM) defined in the PCIe specification. Additionally, input/output (I/O) memory management units (IOMMUs) (such as Intel VT-d) can use BDF space as an index, but may not be configured to directly comprehend Segments. Accordingly, in some instances, a separate ECAM and IOMMU is duplicated for each Segment defined in a system. FIG. 5 illustrates an example of a system including multiple segments (e.g., 505*a-c*). For instance, a Segment, in this example, is defined for each one of three switches 510, 515, 520 that connect to a Root Complex 525. In this example, a separate IOMMU and ECAM (e.g., 530*a-c*) can be implemented at the Root Complex 525 to facilitate each of the Segments (e.g., 505*a-c*). Further, in this example, a variety of endpoints (EP) are connected to various buses in each Segment. In some cases, configuration space of a Segment may reserve multiple bus addresses for potential hot plug events, limiting the total number of bus addresses that are available within each Segment. Still further, allocation of bus numbers in one or more of the Segments may be according to an algorithm that concerns itself little with densely populating the addresses and making compact use of the available bus address space. This can result in wasted configuration address (i.e., BDF) space in some instances.

Traditional PCIe systems are configured to assign address space in a manner that, when applied to modern and emerging use cases, tends to make inefficient use of BDF space and of Bus Numbers in particular. While relatively few implementations may actually involve a single system consuming all 64K of unique BDF values (e.g., defined under PCIe), deep hierarchies such as those that occur, for example, in deep hierarchies of PCIe Switches, may use up available Bus Numbers very quickly. Additionally, in applications supporting hot plugging, large portions of the BDF space may be typically reserved for future potential use (i.e., when a future device is hot plugged to the system), taking additional swaths of Bus Numbers from the pool immediately usable by a system. While Segment mechanisms can be applied to address this issue, Segments themselves have poor scaling because, as noted above, additional hardware resources (e.g., IOMMUs) are to be built into the CPU, platform controller hub (PCH), system on chip (SoC), root complex, etc., in order to support each segment. Thus using Segments to address deep hierarchies results in scaling the system to satisfy a worst case system requirement, which is typically much more than what would be needed for most systems, resulting in significant waste of platform resources. Further, Segments can be difficult (and, in some cases, essentially impossible) to create outside of a root complex of the system.

Figure 6:
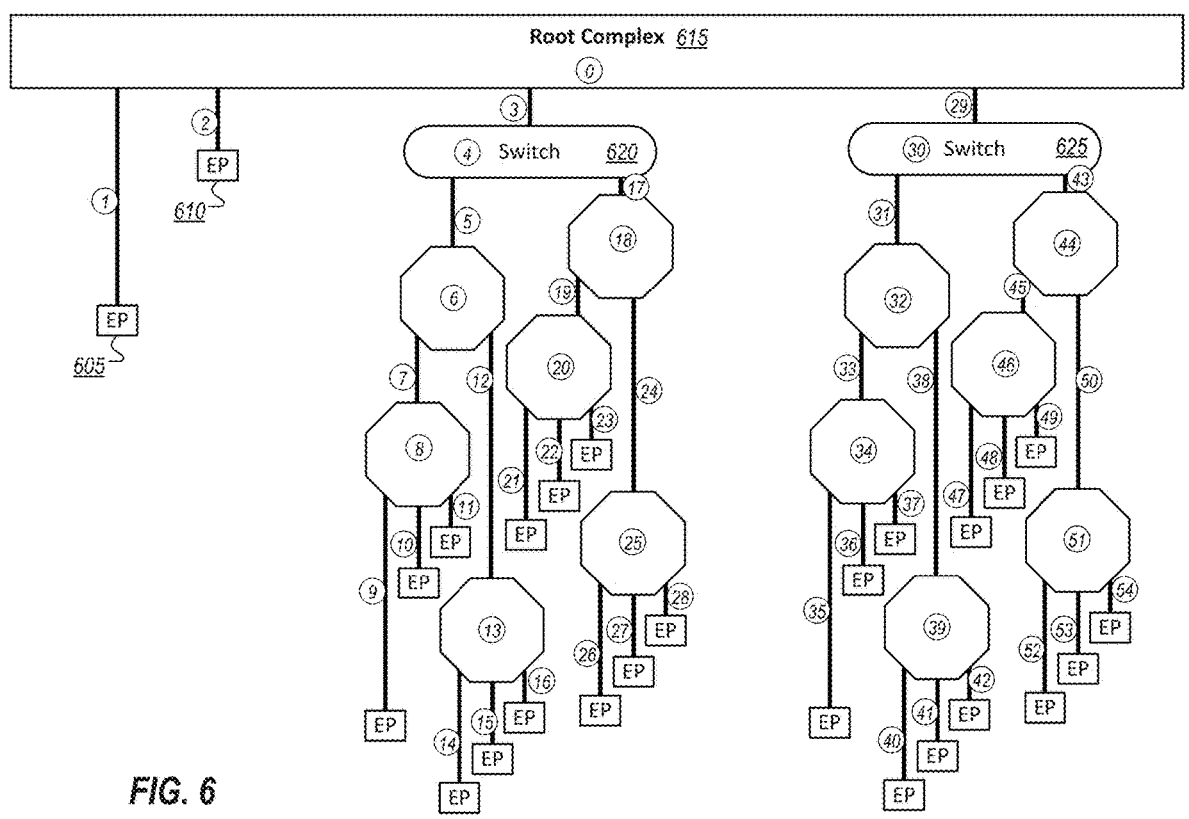
FIG. 6 illustrates a representation of enumeration of bus identifiers in a system.

In some implementations, a system can be provided to enable more efficient use of BDF space and address at least some of the example issues above. This can allow for the expansion of PCIe, Thunderbolt, system on chip fabrics (e.g., Intel On-Chip System Fabric (IOSF) and others), and other interconnects to very large topologies, but without requiring dedicated resources in the Root Complex, as would be the case in solutions relying exclusively on Segments or other alternatives. FIG. 6 illustrates an example assignment of bus numbers to buses within the system according to an example PCIe BDF assignment. In this example, a system with two devices 605, 610 directly connected to a Root Complex 615 and two Switch-based hierarchies (corresponding to switches 620, 625) are enumerated with approximately the densest possible Bus Number allocations using conventional BDF assignment (as designated by circle labels (e.g., 650*a-d*, etc.)). In deep hierarchies, the available bus numbers in a single BDF space can be quickly consumed. Further, real world systems typically allocate bus numbers far less efficiently, resulting in sparse (or "wasted") allocation of the BDF space.

Another problem with use cases that support hot add/remove such as Thunderbolt and, in some cases, PCIe-based storage, is that the Bus Number assignments in BDF space are "rebalanced" to address hardware topology changes occurring in a running system. Rebalancing, however, can be very difficult for system software to do because, in typical cases, all PCI Functions are then forced into a quiescent state in connection with the rebalancing in order to allow the BDF space to be re-enumerated by the system, followed by the re-enabling of the PCI Functions. This process can be quite slow, however, and typically results in the system freezing for what can be very long periods of time (e.g., long enough to be disruptive to running applications, and visible to the end user). An improved system can also be provided to shorten the time it takes to apply a revised BDF space such that the rebalancing process can be performed in a span of hundredths of milliseconds or quicker and without explicitly placing PCI Functions into quiescent states. Finally, very large systems or systems with (proprietary) mechanisms for supporting multiple Root Complexes, may be defined to require the use of Segments.

As introduced above, the Flattening Portal Bridge (FPB) can be an optional mechanism which can be used to address at least some of the example issues above, including improving the scalability and runtime reallocation of Bus/Device/Function (BDF) and Memory-Mapped IO (MMIO) spaces. The concept of "BDF space" is related to the Configuration Address Space, but is generalized to recognize that the BDF is the basis for the Requester and Completer IDs, the routing of completions, and can serve as an essential element in several mechanisms in addition to the routing of Configuration Requests. For Functions associated with an Upstream Port, the Function Number portion of the BDF space address (e.g., 3-bit Function Number) may be determined by the construction of the Upstream Port hardware, whereas the Bus and Device Number portions may be determined by the Downstream Port above the Upstream Port. An example FPB may maintain the existing architecture where the Upstream Port determines the mapping of Functions within the 3 bit Function Number portion of the BDF, and operates only within the 13 bit Bus/Device Number portion. In such instances, "BD Space" may refer to the 13 bit Bus/Device Number portion of the BDF. MMIO here can refer specifically to Memory Read and Write Requests that pass through a Root Port, Switch Port, or logical Bridge where the FPB capability provides additional mechanisms to determine the address decoding of such requests. A Bridge that implements the FPB capability can itself also be referred to as an FPB.

Figure 7A:
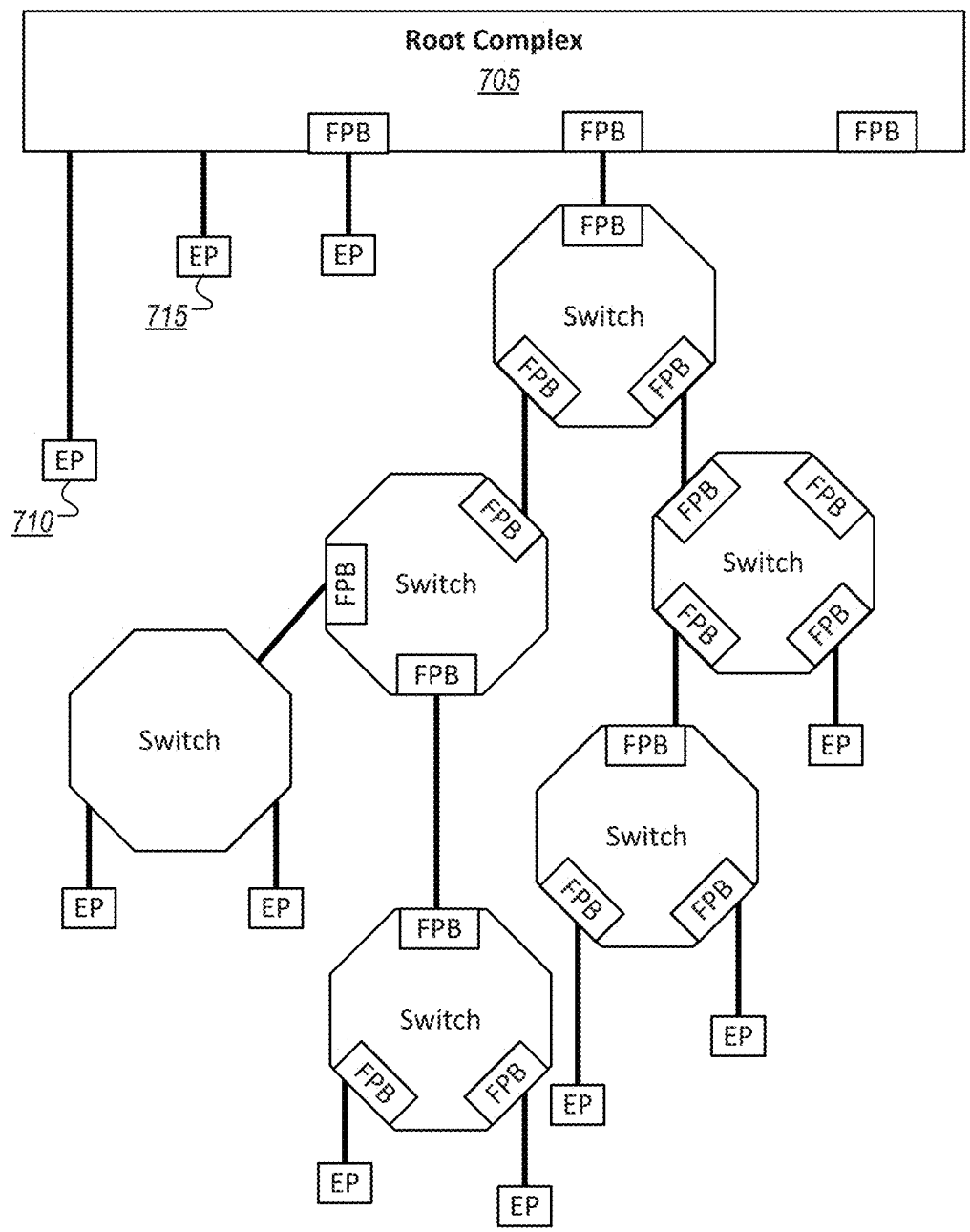
FIG. 7A illustrates a representation of system employing instances of a flattening portal bridge (FPB).

FIG. 7A is a simplified block diagram illustrating the provision of FPB logic at each port of one or more switches within a system. Some switches may not include FPB logic and only support bus enumeration according to conventional BDF or MMIO space assignments. Moreover, ports of a root complex 705 may also include FPB logic, such as ports designed to potentially support dynamic cases hot plugging or flexibly support varied architecture (e.g., not predefined at design time of the root complex), among other examples. Further, some ports of the root complex 705, may omit FPB logic, such as ports designed to support static cases, such as ports connected to endpoints 710, 715, in the example of FIG. 7A, among other examples.

FPB logic can be enabled or disabled at each port possessing the FPB logic. FPB logic can be implemented in hardware, firmware, and/or software to support the assignment of BDF or MMIO space using a "flattened" approach. For example, each bus interconnecting switches, endpoints, and the root complex can be assigned a unique bus number (e.g., as discussed in connection with FIG. 6), with a number of devices capable of being addressed by a respective one of 32 possible device numbers under each bus number, and a number of possible functions numbers capable of being addressed by a respective one of 8 possible function numbers under each device number. Flattening through FPB can allow at least some of the buses to be addressed uniquely by a bus-device (BD) number combination (rather than by a unique bus number), extending the maximum number of unique potential bus addresses from 256 (under traditional PCIe bus number enumeration) to 8192 (under BD bus enumeration). As a consequence, under FPB, the bus number can be re-used for several different buses, albeit with each bus number having a unique BD number (i.e., the bus number portion of the BD being the same but the device number under that bus number being different). Some branches of the system can utilize conventional bus addressing (e.g., by BDF bus number), while other branches utilize FPB-based addressing. Indeed, a mix of bus enumeration schemes can be employed, with the result remaining unique bus addresses being employed within the system.

Figure 7B:
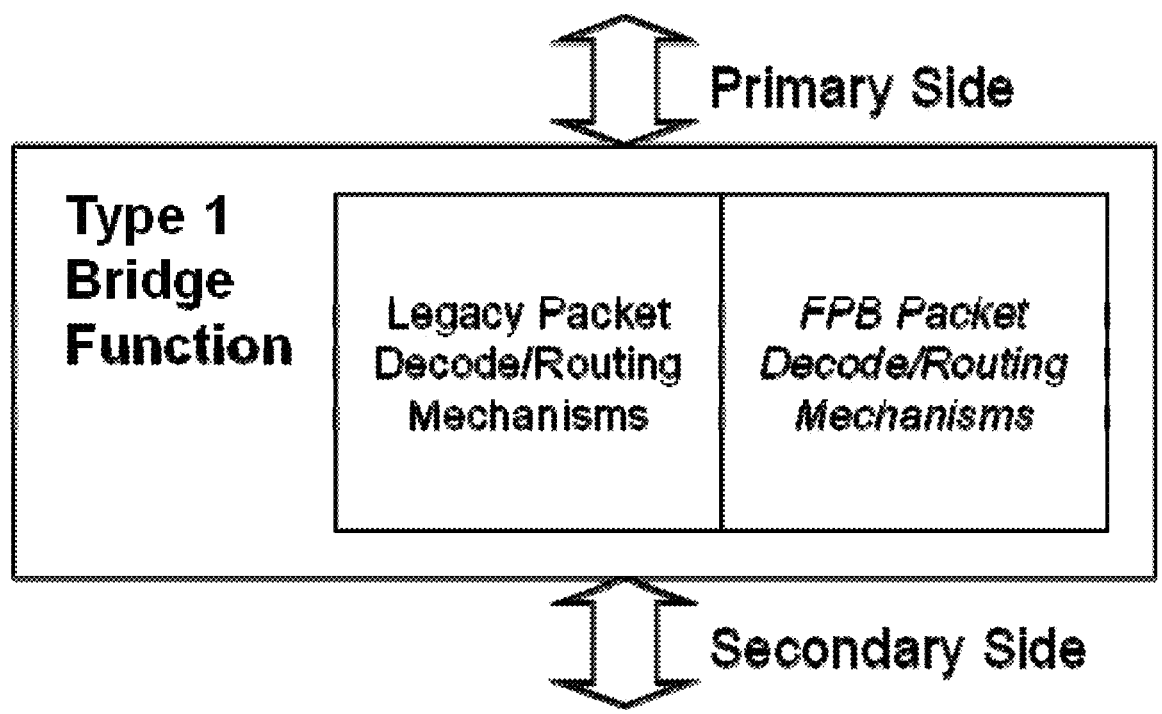
FIG. 7B illustrates an example implementation of a FPB.

Turning to FIG. 7B is a simplified block diagram illustrating a high level architecture of an example implementation of a FPB logic block (such as illustrated at ports shown in the example of FIG. 7A). A type 1 bridge function can be provided through each FPB module. The bridge function can support both legacy packet decode/routing mechanisms (e.g., conventional PCIe BDF decoding and routing) as well as FPB packet decode/routing mechanisms.

FPB changes the way BDF resources are consumed by Switches to reduce waste, by "flattening" the way Bus Numbers are used inside of Switches and by Downstream Ports. FPB defines mechanisms for system software to allocate BDF and MMIO resources in non-contiguous ranges, enabling system software to assign pools of BDF/MMIO from which it can allocate "bins" to Functions below the FPB. This allows system software to assign BDF/MMIO required by a device hot-add without having to rebalance other, already assigned resource ranges, and to return to the pool resources freed, for example, by a hot remove event. FPB is defined to allow the legacy and new mechanisms to operate simultaneously, such that, for example, it is possible for system firmware/software to implement a policy where the legacy mechanisms continue to be used in parts of the system where the FPB mechanisms may not be required. In the example of FIG. 7B, the decode logic may be assumed to provide a '1' output when a given TLP is decoded as being associated with the bridge's Secondary Side. The legacy decode mechanisms may apply as before, so for example only the Bus Number portion (bits 15:8) of a BDF address may be tested by the legacy BDF decode logic, among other examples.

Figure 8:
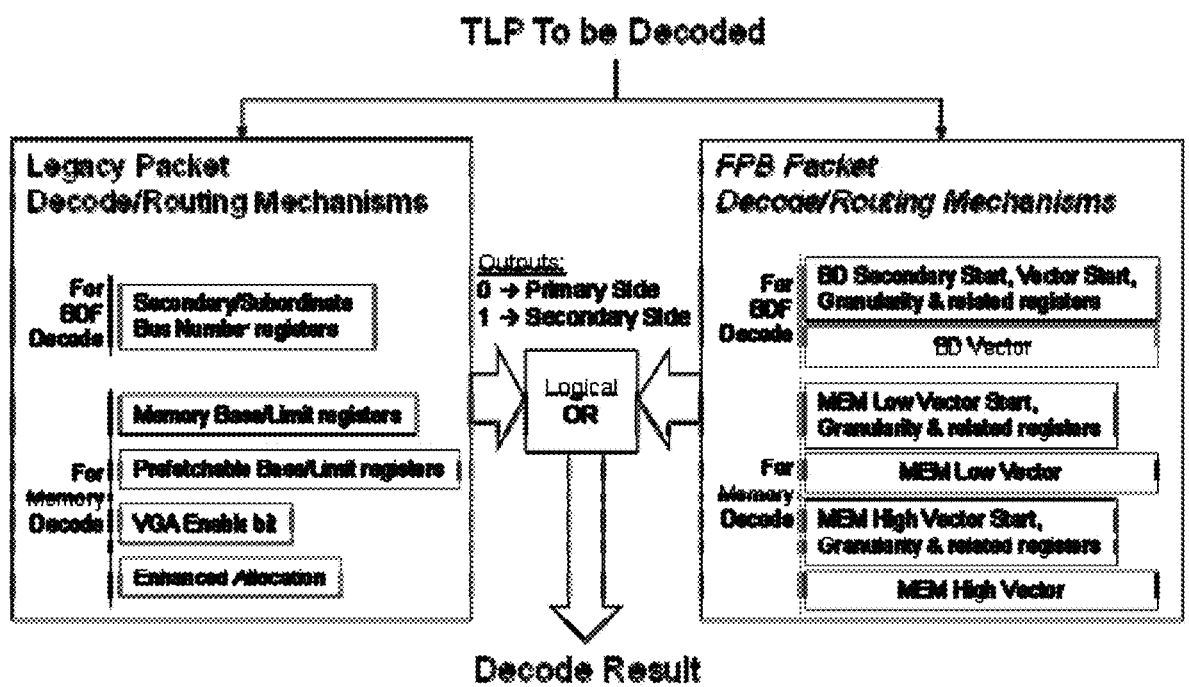
FIG. 8 illustrates a detailed representation of an example FPB.

As illustrated in the example of FIG. 8, an instance of FPB logic can include both legacy packet decode/routing mechanisms and FPB packet decode/routing mechanisms. For legacy packet decode/routing mechanisms. A TLP can be identified at the FPB-provisioned port and legacy packet decode/routing mechanisms can determine whether to route the TLP to the secondary side of the port or to keep the TLP routing at the primary side, based on conventional BDF routing. Likewise, the FPB packet decode/routing mechanism can determine whether to route the TLP to the secondary side of the port or to keep the TLP routing at the primary side, based on flattened BDF routing. If either the legacy packet decode/routing mechanisms or the FPB packet decode/routing mechanisms output an indication that the packet should proceed to the secondary side, routing of the packet traverses the bridge to the secondary side for routing to its destination. Legacy packet decode/routing mechanisms can include, for BDF decode, secondary/subordinate bus number registers and, for memory (e.g., MMIO) decode, memory base/limit registers, prefetchable base/limit registers, a VGA enable bit, enhanced allocation, among other mechanisms usable by the FPB logic. FPB packet decode/routing mechanisms can include, for BD space decode, BD secondary start, vector start, granularity, and related registers, for use in connection with the BD vector. Memory decode can also utilize vectors in FPB, such as a MEM Low Vector for use in connection with MEM Low Vector Start, Granularity, and related MEM Low registers and a MEM High Vector for use in connection with MEM High Vector Start, Granularity, and related MEM High registers, among other example registers, mechanisms, functionality, and features.

In some cases, although FPB may add additional ways for a specific Bridge to decode a given TLP, FPB may not change anything about the fundamental ways that Bridges operate within the Switch and Root Complex architectural structures. In one example, FPB uses the same architectural concepts to provide management mechanisms for three different resource types: the Bus/Device space, bits 15:3, of BDF ("BD"); Memory below 4 GB ("MEM Low"); and Memory above 4 GB ("MEM High"). A hardware implementation of FPB is permitted to support any combination of these three mechanisms. For each mechanism, FPB uses a bit-vector to indicate, for a specific subset range of the selected resource type, if resources within that range are associated with the Primary or Secondary side of the FPB. Hardware implementations can be permitted to implement a small range of sizes for these vectors, and system firmware/software is enabled to make the most effective use of the available vector by selecting an initial offset at which the vector is applied in increasing BD/Address order, and a granularity for the individual bits within the vector to indicate the size of the BD/Address resource set to which the bits in a given vector apply.

For each of the BD/Mem Low/Mem High mechanisms, it may be desirable, especially for a Root Complex, to provide a mechanism, e.g. configuration registers, by which hardware or system-specific firmware/software can constrain the permissible range of BD/MMIO that system software is allowed to assign to the Secondary Side of a Root Port bridge. This may simplify the construction of multi-component Root Complexes, for example, by ensuring that system software will not attempt to apply FPB mechanisms to overlapping ranges of BD/MMIO space between Root Ports implemented on different components of the multi-component Root Complex, for example so that the Root Ports on one component are permitted to work within a given range of BD/MMIO resources, and the Root Ports on another component are permitted to work within a different, non-overlapping with the first range, of BD/MMIO resources, among other examples.

In the static use cases (or simply "static cases") there are limits on the size of hierarchies and number of endpoints due to the Bus and Device number "waste" caused by the PCI/PCIe architectural definition for Switches, and by the traditional requirement that Downstream Ports associate an entire Bus Number with their Link. In some implementations, this class of problems can be addressed by "flattening" the use of BDF space so that Switches and Downstream Ports are able to make more efficient use of the available space. For Dynamic use cases (or simply "Dynamic cases"), rebalancing has been avoided by reserving large ranges of Bus Numbers and memory-mapped I/O (MMIO) in the Bridge above the relevant Endpoint(s) to attempt to satisfy any needs within the pre-allocated ranges. This approach, however, leads to additional waste, which amplifies the shortcomings of traditional BDF allocation. Moreover, this approach can be difficult to implement in the general case, even for relatively simple cases, where, for example, one might have a solid-state drive (SSD) implementing a single Endpoint replaced by a unit that has a Switch, creating an internal hierarchy within the unit, so that although an initial allocation of just one Bus would have been sufficient, the initial allocation breaks immediately with the new unit. Further, for MMIO the pre-allocation approach can be problematic when hot-plugged Endpoints may require the allocation of MMIO space below 4 GB (by its nature a limited resource), which is quickly used up by pre-allocation of even relatively small amounts, and for which pre-allocation is unattractive because of the multiple system elements placing demands on system address space allocation below 4 GB. Depending on multiple factors including a given system's physical memory addressing capability, there may, in some cases, also be resource constraints in MMIO space above 4 GB. The constraints that apply to MMIO space below 4 GB may differ from those that apply above 4 GB (accordingly separate mechanisms may be optimized for each).

In some implementations, at least some of the issues in both the Static and Dynamic use cases can be addressed by defining mechanisms to enable discontinuous resource range (re/)allocation for both BDF and MMIO. System software can possess the ability to maintain resource "pools," which can be allocated (and freed back to) at run-time, without disrupting other operations in progress as is required with rebalancing. A Flattening Portal Bridge (FPB) can thereby be provided as an optional Capability that may be implemented by Type 1 (Bridge) Functions in Root and Switch Ports to support more efficient and dense BDF allocation, to enable reallocation of BDF resources without requiring the rebalancing of resources assigned elsewhere in a system, and to enable discontiguous MMIO regions and avoid the need to rebalance MMIO resources. IO space allocation, in some implementations, may be left as-is and not modified by FPB. Among the potential example advantages provided by an example FPB, BDF space allocation can be more efficient and dense enabling larger hierarchies, runtime reallocation of resources can be enabled for hot add/remove cases without the need to globally rebalance resources, the requirement for BDFs and MMIO to be allocated in contiguous ranges can be retired, mixed systems can be supported including components that support FPB along with components that do not, all while permitting no changes to existing Discrete Endpoints. For instance, legacy root complexes, Switches, Bridges and Endpoints can be used in mixed system environments along with RCs and Switches implementing FPB.

In some implementations, FPB can include the provisioning of new hardware and software supporting the FPB. This additional hardware and/or software, however, can be optionally enabled in that it has no effect unless enabled, and is disabled by default. In some instances, hardware changes to implement FPB can include hardware involving Type 1 functions, while allowing Endpoints and hardware supporting Type 0 functions to remain unaffected. FPB-enabled hardware can pass existing compliance and interoperability tests and new tests can be developed to explicitly evaluate the additional FPB functionality. Software intending to work with devices implementing the FPB functionality can be configured to comprehend the new extended capability. Legacy software will continue to function with FPB hardware, but will not be able to make use of the FPB features.

FPB can continue to allow the use of legacy resource allocation mechanisms for BDF and MMIO. In some cases it may be desirable to have system firmware continue to perform the initial system resource allocation using only the legacy mechanisms, and only use FPB after the operating system has booted. FPB may support this and specifically enable the system to continue to use the resources as allocated by the legacy mechanisms. FPB is specifically intended to enable system software to modify the resource allocation within the system during runtime requiring only that the hardware and processes associated with the resources being modified be made quiescent, and allowing all other hardware and processes to continue normal operation.

To support the runtime use of FPB by system software, FPB hardware implementations should avoid introducing stalls or other types of disruptions to transactions in flight, including during the times that system software is modifying the state of the FPB hardware. It is not, however, expected that hardware will attempt to identify cases where system software erroneously modifies the FPB configuration in a way that does affect transactions in flight. Just as with the legacy mechanisms, it is the responsibility of system software to ensure that system operation is not corrupted due to a reconfiguration operation. It is not explicitly required that system firmware/software perform the enabling and/or disabling of FPB mechanisms in a particular sequence, however rules can be defined to implement resource allocation operations in a hierarchy such that the hardware and software elements of the system are not corrupted or caused to fail.

In some implementations, if system software violates any of the rules concerning FPB, the hardware behavior can be undefined. FPB can be implemented in any PCI Bridge (Type 1) Function, and every Function that implements FPB implements the FPB Extended Capability. If a Switch implements FPB then the Upstream Port and all Downstream Ports of the Switch implement FPB. A Root Complex may be permitted to implement FPB on some Root Ports but not on others. A Root Complex may be permitted to implement FPB on an internal logical bus of the Root Complex. A Type 1 Function is permitted to implement the FPB mechanisms applying to any one, two or three of these elemental mechanisms (BD, MEM Low, MEM High). System software may be permitted to enable any combination (including all or none) of the elemental mechanisms supported by a specific FPB. The error handling and reporting mechanisms, except where explicitly modified in this section, may be unaffected by FPB. In the event of a reset of an FPB Function, the FPB hardware Clears all bits in all implemented vectors. Once enabled (e.g., through the FPB BD Vector Enable, FPB MEM Low Vector Enable, and/or FPB MEM High Vector Enable bits), if system software subsequently disables an FPB mechanism, the values of the entries in the associated vector are undefined, and if system software subsequently re-enables that FPB mechanism the FPB hardware Clears all bits in the associated vector.

In some implementations, system software is expressly permitted to modify an FPB vector when the corresponding FPB mechanism is enabled. If an FPB is implemented with the No_Soft_Reset bit Clear, when that FPB is cycled through D0→D3hot→D0, then, as with other Function Configuration Context, all FPB mechanisms are to be disabled, and the FPB clears all bits in all implemented vectors. If an FPB is implemented with the No_Soft_Reset bit Set, when that FPB is cycled through D0→D3hot→D0, then, as with other Function Configuration Context, all FPB configuration states do not change and the entries in the FPB vectors are retained by hardware. Hardware can be implemented such that no requirement exists for performing any type of bounds checking on FPB calculations, and system software can ensure that the FPB parameters are correctly programmed. For instance, a system software can be permitted to program Vector Start values that cause the higher order bits of the corresponding vector to surpass the resource range associated with a given FPB, with system software ensuring that those higher order bits of the vector are Clear. Examples of errors that system software must avoid include duplication of resource allocation, combinations of start offsets with set vector bits that could create "wrap-around" or bounds errors, among other examples.

Figure 9:
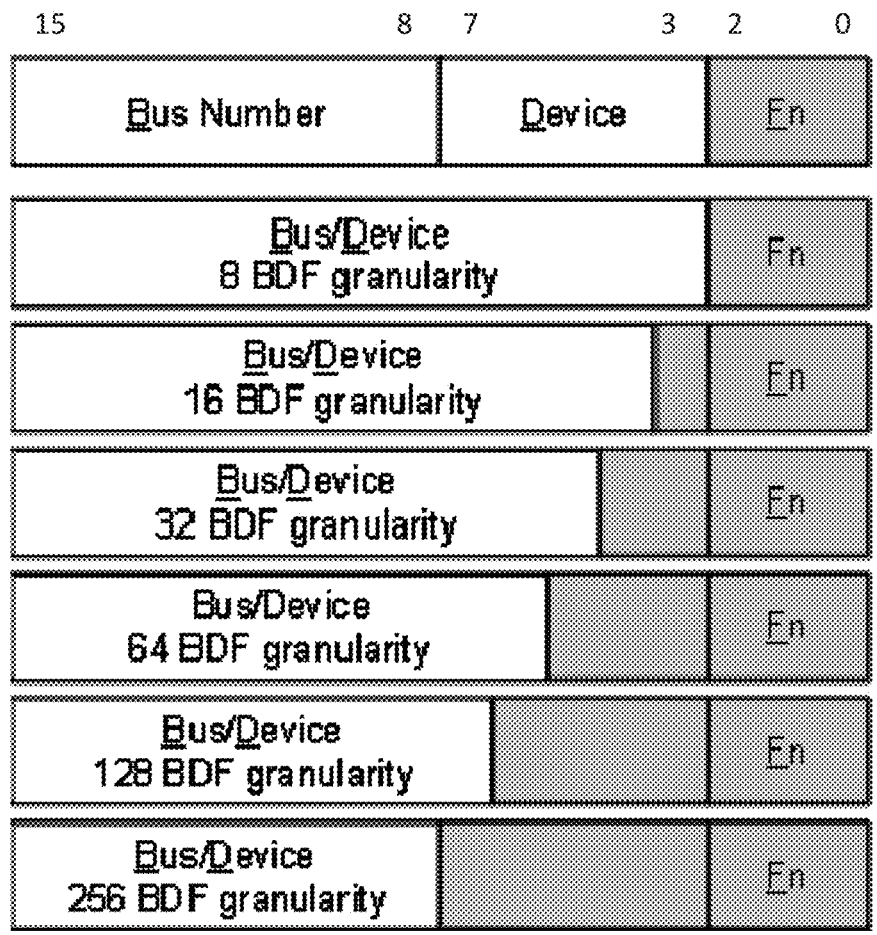
FIG. 9 illustrates example addresses in BDF space and supported granularities.

In some implementations of the FPB BD mechanism, FPB hardware considers a specific BDF to be associated with the Secondary side of the FPB if that BDF falls within the Bus Number range indicated by the values programmed in the Secondary and Subordinate Bus Number registers logically OR'd with the value programmed into the corresponding entry in the BD Vector. When using only the FPB BD mechanism for BDF decoding, system software can be utilized to ensure that both the Secondary and Subordinate Bus Number registers are 0. System software can further ensure that the FPB routing mechanisms are configured such that Configuration Requests targeting Functions Secondary side of the FPB will be routed by the FPB from the Primary to Secondary side of the FPB. The FPB BD mechanism can be applied with different granularities, programmable by system software through the FPB BD Vector Granularity register in the FPB BD Vector Control 1 Register. For instance, FIG. 9 illustrates example addresses in BDF space and supported granularities. The representation in FIG. 9 illustrate relationships between the layout of addresses in BDF space and the supported granularities.

In some implementations, system software programs the FPB BD Vector Granularity and FPB BD Vector Start fields in the FPB BD Vector Control 1 register per the constraints described in the descriptions of those fields. The FPBs (other than those associated with Upstream Ports of Switches) may be constrained such that when PCIe Alternative Routing ID Interpretation (ARI) Forwarding is not supported, or when the ARI Forwarding Enable bit in the Device Control 2 register is Clear, FPB hardware is to convert a Type 1 Configuration Request received on the Primary side of the FPB to a Type 0 Configuration Request on the Secondary side of the FPB when the BD address (bits 15:3 of the BDF) of the Type 1 Configuration Request matches the value in the BD Secondary Start field in the FPB BD Vector Control 2 Register, and system software must configure the FPB accordingly. When the ARI Forwarding Enable bit in the Device Control 2 register is Set, FPB hardware converts a Type 1 Configuration Request received on the Primary side of the FPB to a Type 0 Configuration Request on the Secondary side of the FPB when the Bus Number address (bits 15:8 of the BDF) of the Type 1 Configuration Request matches the value in the Bus Number address (bits 15:8 only) of the Secondary Start field in the FPB BD Vector Control 2 Register, and system software must configure the FPB accordingly.

In some implementations, for FPBs associated with Upstream Ports of Switches only, FPB hardware can use the FPB Num Sec Dev field of the FPB Capability Register to indicate the quantity of Device Numbers associated with the Secondary Side of the Upstream Port Bridge, which can be used by the FPB in addition to the BD Secondary Start field in the FPB BD Vector Control 2 Register to determine when a Configuration Request received on the Primary side of the FPB targets one of the Downstream Ports of the Switch, determining in effect when such a Request is to be converted form a Type 1 Configuration Request to a Type 0 Configuration Request, with system software configuring the FPB appropriately. If ACS Source Validation is enabled at a Downstream Port, the FPB checks the Requester ID of each Upstream Request received by the Port to determine if it is mapped to the Secondary side of the FPB, and if the Requester ID is not then this can constitute a reported error (e.g., ACS Violation) associated with the Receiving Port. FPBs can further implement bridge mapping for INTx virtual wires.

In one example, to determine which entry in the FPB BD Vector applies to a given BDF address, FPB-provisioned hardware and software can apply an algorithm such as:

```
// "BDF" is the BDF address to be tested
IF (BDF <= FPB_BD_Vector_Start) THEN
    EXIT; // In this case the BDF is out of range
// Otherwise, apply Starting offset
OffsetIndex := BDF - FPB_BD_Vector_Start;
// Next adjust for the granularity of the vector
// (this operation is a divide, done here
// as a right shift with zero fill)
OI_Gran_Adjusted :=
    ShiftRightZeroFill(FPB_BD_Vector_Granularity,
        Offset Index);
IF (OI_Gran_Adjusted >= LENGTHOF(FPB BD Vector)) THEN
    EXIT; // In this case the BDF is out of range
// Otherwise, locate the bit in the (bit addressed) vector
SelectorBit := FPB_BD_Vector[OI_Gran_Adjusted] ;
// If SelectorBit is Set, then the BDF is considered to be
// on the Secondary Side, if Clear, the BDF is
// considered to be on the Primary Side.
```

In other words, to determine which entry in the FPB BD Vector applies to a given BDF address, logic may determine if the BD address is below the value of FPB BD Vector Start. If the BD address is below, then the BD is out of range and is not to be associated with the Secondary side of the bridge. Otherwise, the logic may calculate the offset within the vector by first subtracting the value of FPB BD Vector Start, then dividing this according to the value of FPB BD Vector Granularity to determine the bit index within the vector. If the bit index value is greater than the length indicated by FPB BD Vector Size Supported, then the BD is out of range (above) and is not to be associated with the Secondary side of the bridge. However, if the bit value within the vector at the calculated bit index location is 1b, then the BD address is associated with the Secondary side of the bridge, otherwise the BD address is associated with the Primary side of the bridge.

The FPB MEM Low mechanism can be applied with different granularities, programmable by system software through the FPB MEM Low Vector Granularity register in the FPB MEM Low Vector Control Register. FIG. 10 illustrates the layout of addresses in the memory address space below 4 GB to which the FPB MEM Low mechanism applies and the effect of granularity on these addresses. FIG. 10 also relates to the definition of the Flattening Portal Bridge (FPB) Extended Capability. System software can program the FPB MEM Low Vector Granularity and FPB MEM Low Vector Start fields in the FPB MEM Low Vector Control register per the constraints described in the descriptions of those fields.

In instances of the FPB MEM Low mechanism, FPB hardware can consider a specific Memory address to be associated with the Secondary side of the FPB if that Memory address falls within any of the ranges indicated by the values programmed in other Bridge Memory decode registers (enumerated below) logically OR'd with the value programmed into the corresponding entry in the MEM Low Vector. Other Bridge Memory decode registers can include: Memory Base/Limit registers in the Type 1 (Bridge) header; Prefetchable Base/Limit registers in the Type 1 (Bridge) header; VGA Enable bit in the Bridge Control Register of the Type 1 (Bridge) header; Enhanced Allocation (EA) Capability; FPB MEM High mechanism (if supported and enabled). In one example, to determine which entry in the FPB MEM Low Vector applies to a given Memory address, hardware and software can apply an algorithm such as:

```
// "Address" is the memory address to be tested
// expressed in MB units (i.e. bits [31:20] )
IF (Address <= FPB_MEM_Low_Vector_Start) THEN
    EXIT; // In this case the address is out of range
// Otherwise, apply Starting offset
OffsetIndex := Address - FPB_MEM_Low_Vector_Start;
// Next adjust for the granularity of the vector
// (this operation is a divide, done here
// as a right shift with zero fill)
OI_Gran_Adjusted :=
    ShiftRightZeroFill(FPB_MEM_Low_Vector_Granularity,
        Offset Index);
IF (OI_Gran_Adjusted >=
        LENGTHOF (FPB_MEM_Low_Vector)) THEN
    EXIT; // In this case the address is out of range
// Otherwise, locate the bit in the (bit addressed) vector
SelectorBit := FPB_MEM_Low_Vector[OI_Gran_Adjusted];
// If SelectorBit is Set, then the address is
// considered to be on the Secondary Side,
// if Clear, the address is considered to be on
// the Primary Side.
```

In other words, to determine which entry in the FPB MEM Low Vector applies to a given Memory address, hardware and software can determine if the Memory address is below the value of FPB MEM Low Vector Start. If so, the Memory address may is out of range (below) and is not associated with the Secondary side of the bridge. The logic may calculate the offset within the vector by first subtracting the value of FPB MEM Low Vector Start, then dividing this according to the value of FPB MEM Low Vector Granularity to determine the bit index within the vector. If the bit index value is greater than the length indicated by FPB MEM Low Vector Size Supported, then the Memory address is out of range (above) and is not to be associated with the Secondary side of the bridge. On the other hand, if the bit value within the vector at the calculated bit index location is 1b, then the Memory address may be associated with the Secondary side of the bridge, otherwise the Memory address is associated with the Primary side of the bridge.

System software can program the FPB MEM High Vector Granularity and FPB MEM High Vector Start Lower fields in the FPB MEM High Vector Control 1 register per the constraints described in the descriptions of those field. In instances of the FPB MEM High mechanism, FPB hardware can consider a specific Memory address to be associated with the Secondary side of the FPB if that Memory address falls within any of the ranges indicated by the values programmed in other Bridge Memory decode registers (enumerated below) logically OR'd with the value programmed into the corresponding entry in the MEM Low Vector. Other Bridge Memory decode registers can include Memory Base/Limit registers in the Type 1 (Bridge) header; Prefetchable Base/Limit registers in the Type 1 (Bridge) header; VGA Enable bit in the Bridge Control Register of the Type 1 (Bridge) header; Enhanced Allocation (EA) Capability; and FPB MEM Low mechanism (if supported and enabled). In one example, to determine which entry in the FPB MEM High Vector applies to a given Memory address, hardware and software can apply an algorithm such as:

```
// "Address" is the memory address to be tested
// expressed in 16MB units (i.e. bits [63:24])
// "FPB_MEM_High_Vector_Start" is the concatenation
// of FPB MEM High Vector Start Upper and
// FPB MEM High Vector Start Lower
IF (Address <= FPB_MEM_High_Vector_Start) THEN
    EXIT; // In this case the address is out of range
// Otherwise, apply Starting offset
OffsetIndex := Address - FPB_MEM_High_Vector_Start;
// Next adjust for the granularity of the vector
// (this operation is a divide, shown here
// as a right shift with zero fill)
// We have to apply an additional shift of 4 bits
// to account for the granularity units
OI_Gran_Adjusted :=
    ShiftRightZeroFill(
        ShiftRightZeroFill(FPB_MEM_High_Vector_Granularity,
            OffsetIndex), 4);
IF (OI_Gran_Adjusted >=
        LENGTHOF(FPB_MEM_High_Vector)) THEN
    EXIT; // In this case the address is out of range
// Otherwise, locate the bit in the (bit addressed) vector
SelectorBit := FPB_MEM_High_Vector[OI_Gran_Adjusted];
// If SelectorBit is Set, then the address is
// considered to be on the Secondary Side,
// if Clear, the address is considered to be on
// the Primary Side.
```

In other words, to determine which entry in the FPB MEM High Vector applies to a given Memory address, hardware and software can determine if the Memory address is below the value of FPB MEM High Vector Start. If so, the Memory address can be determined to be out of range (below) and is not associated with the Secondary side of the bridge. Otherwise, the offset within the vector can be calculated by first subtracting the value of FPB MEM High Vector Start, then dividing this according to the value of FPB MEM High Vector Granularity to determine the bit index within the vector by means of this mechanism. If the bit index value is greater than the length indicated by FPB MEM High Vector Size Supported, then the Memory address is out of range (above) and so is not associated with the Secondary side of the bridge. Otherwise, if the bit value within the vector at the calculated bit index location is 1b, then the Memory address is associated with the Secondary side of the bridge, or the Memory address is associated with the Primary side of the bridge.

In some implementations, FPB may use a bit vector mechanism to describe address spaces (BD Space, MEM Lo, & Mem Hi). A bridge supporting FPB may contain the following for each address space where it supports the use of FPB: a Bit vector; a Start Address register; and a Granularity register. These values may be used by the bridge to determine if a given address is part of the range decoded by FPB as associated with the secondary side of the bridge. An address that is not determined to be associated with the secondary side of the bridge using either or both of the legacy decode mechanisms and the FPB decode mechanisms is (by default) associated with the primary side of the bridge. Here, the term "associated" may mean, for example, that the bridge will apply the following handling to TLPs:

A TLP associated with the Primary side and received at the Primary side may be handled as an Unsupported Request (UR);

A TLP associated with the Primary and received at the Secondary side may be handled as a Forward upstream;

A TLP associated with the Secondary side and received at the Primary side may be handled as a Forward downstream;

A TLP associated with the Secondary side and received at the Secondary side may be handled as a Unsupported Request (UR), etc.

In FPB, every bit in the vector may represents a range of addresses, where the size of that range is determined by the selected granularity. If a bit in the vector is Set, it indicates that packets addressed to an address within the corresponding range are to be associated with the secondary side of the bridge. The specific range of addresses each bit represents is dependent on the index of that bit, and the values in the Start Address & Granularity registers. The Start Address register indicates the lowest address described by the bit vector. The Granularity register indicates the size of the region that is represented by each bit. Each successive bit in the vector applies to the subsequent range, increasing with each bit according to the Granularity.

In some cases, Downstream Ports that do not have ARI Forwarding enabled are to associate only Device 0 with the device attached to the Logical Bus representing the Link from the Port. Configuration Requests targeting the Bus Number associated with a Link specifying Device Number 0 are delivered to the device attached to the Link. Configuration Requests specifying all other Device Numbers (1-31) may thus be terminated by the Switch Downstream Port or the Root Port with an Unsupported Request Completion Status (equivalent to Master Abort in PCI). In some cases, non-ARI Devices may not assume that Device Number 0 is associated with their Upstream Port, but will instead capture their assigned Device Number and respond to all Type 0 Configuration Read Requests, regardless of the Device Number specified in the Request. In some examples, when an ARI Device is targeted and the Downstream Port immediately above it is enabled for ARI Forwarding, the Device Number is implied to be 0, and the traditional Device Number field is used instead as part of an 8-bit Function Number field. If Configuration Request Type is 1, FPB logic can determine if the Bus Number and Device number fields are (in the case of a PCI Express-PCI Bridge) equal to the Bus Number assigned to secondary PCI bus or, in the case of a Switch or Root Complex, equal to the Bus Number and decoded Device Numbers assigned to one of the Root (Root Complex) or Downstream Ports (Switch). If so, the Request may be forwarded to that Downstream Port (or PCI bus, in the case of a PCI Express-PCI Bridge). If not equal to the Bus Number of any of Downstream Ports or secondary PCI bus, but in the range of Bus Numbers assigned to either a Downstream Port or a secondary PCI bus, the Request can be forwarded to that Downstream Port interface without modification.

The Flattening Portal Bridge (FPB) Extended Capability may be an optional Extended Capability that is to be provided for any Bridge Function or Port that implements FPB. If a Switch implements FPB then the Upstream Port and all Downstream Ports of the Switch implement the FPB Extended Capability Structure. A Root Complex is permitted to implement the FPB Extended Capability Structure on some Root Ports but not on others. A Root Complex may be permitted to implement the FPB Capability for internal logical busses in some implementations. In the following description, the FPB registers are accessed by means of a PCIe Extended Capability, but in other example implementations the FPB registers can be accessed through other means including but not limited to a PCI capability structure, or a vendor-defined extended capability. The registers, in some implementations, can be hosted in memory elements of the corresponding switches, bridges, root complex, or other devices within the system.

Table 1 illustrates one example implementation of an FPB Extended Capability Header. In one example, the FPB Extended Capability Header can have an offset of 00h.

TABLE 1

FPB Extended Capability Header

| Bit Location | Register Description |
|---|---|
| 15:0 | PCI Express Extended Capability ID-This field identifies the following structure as an Extended Capability structure for a Flattening Portal Bridge (FPB) |
| 19:16 | Capability Version-This field is a PCI-SIG defined version number that indicates the version of the Capability structure present.<br>Must be 1h for this version of the specification. |
| 31:20 | Next Capability Offset-This field contains the offset to the next PCI Express Capability structure or 000h if no other items exist in the linked list of Capabilities.<br>For Extended Capabilities implemented in Configuration Space, this offset is relative to the beginning of PCI compatible Configuration Space and thus must always be either 000h (for terminating list of Capabilities) or greater than 0FFh. |

Table 2 illustrates one example implementation of an FPB Capability Header. In one example, the FPB Capability Header can have an offset of 04h.

TABLE 2

FPB Capability Register

| Bit Location | Register Description |
|---|---|
| 0 | FPB BD Vector Supported-If Set, indicates that the BD Vector mechanism is supported. |
| 1 | FPB MEM Low Vector Supported-If Set, indicates that the MEM Low Vector mechanism is supported. |
| 2 | FPB MEM High Vector Supported-If Set, indicates that the Mem High mechanism is supported. |
| 7:3 | FPB Num Sec Dev-For Upstream Ports of Switches only, this field indicates the quantity of Device Numbers associated with the Secondary Side of the Upstream Port Bridge. The quantity is determined by adding one to the numerical value of this field.<br>Although it is encouraged that Switch implementations consume Function Numbers efficiently, it is explicitly permitted that Downstream Ports be assigned to Function Numbers that are not contiguous within the indicated range of Device Numbers, and system software is required to scan for Downstream Port Bridges at every Function Number within the indicated quantity of Device Numbers associated with the Secondary Side of the Upstream Port. This field is Reserved for Downstream Ports. |
| 10:8 | FPB BD Vector Size Supported-Indicates the size of the FPB BD Vector implemented in hardware, and constrains the allowed values software is permitted to write to the FPB BD Vector Granularity field.<br>Defined encodings are:<br>Value   Size   Allowed Granularities<br>000b   256 bits   8, 16, 32, 64, 128, 256<br>001b   512 bits   8, 16, 32, 64, 128<br>010b   1K bits   8, 16, 32, 64<br>011b   2K bits   8, 16, 32<br>100b   4K bits   8, 16<br>101b   8K bits   8<br>All other encodings are Reserved<br>If the FPB BD Vector Supported bit is Clear, then the value in this field is undefined and must be ignored by software. |
| 15:11 | Reserved |
| 18:16 | FPB MEM Low Vector Size Supported-Indicates the size of the Mem Low Vector implemented in hardware, and constrains the allowed values software is permitted to write to the FPB MEM Low Vector Start field. |

TABLE 2-continued

FPB Capability Register

| Bit Location | Register Description |
|---|---|
| | Defined encodings are:<br>Value   Size   Allowed Granularities<br>000b   256 bits   1, 2, 4, 8, 16<br>001b   512 bits   1, 2, 4, 8<br>010b   1K bits   1, 2, 4<br>011b   2K bits   1, 2<br>100b   4K bits   1<br>All other encodings are Reserved<br>If the FPB Mem Low Vector Supported bit is Clear, then the value in this field is undefined and must be ignored by software. |
| 23:19 | Reserved |
| 26:24 | FPB MEM High Vector Size Supported-Indicates the size of the Mem Low Vector implemented in hardware.<br>Defined encodings are:<br>000b   256 bits<br>001b   512 bits<br>010b   1K bits<br>011b   2K bits<br>100b   4K bits<br>101b   8K bits<br>All other encodings are Reserved<br>If the FPB Mem High Vector Supported bit is Clear, then the value in this field is undefined and must be ignored by software. |
| 31:27 | Reserved |

Table 3 illustrates one example implementation of an FPB BD Vector Control 1 Register. In one example, the FPB BD Vector Control 1 Register can have an offset of 08h.

TABLE 3

FPB BD Vector Control 1 Register

| Bit Location | Register Description |
|---|---|
| 0 | FPB BD Vector Enable-When Set, enables the FPB BD Vector mechanism<br>If the FPB BD Vector Supported bit is Clear, then it is permitted for hardware to implement this bit as read only (RO), and in this case the value in this field is undefined.<br>Default value of this bit is 0b. |
| 3:1 | Reserved |
| 6:4 | FPB BD Vector Granularity-The value written by software to this field controls the granularity of the FPB BD Vector and the required alignment of the FPB BD Vector Start field (below). Defined encodings are:<br>Value   Granularity   Start Alignment<br>000b   8 BDF   <no constraint><br>001b   16 BDF   . . . 0b<br>010b   32 BDF   . . . 00b<br>011b   64 BDF   . . . 000b<br>100b   128 BDF   . . . 0000b<br>101b   256 BDF   . . . 00000b<br>All other encodings are Reserved<br>Based on the implemented FPB BD Vector size, hardware is permitted to implement as RW only those bits of this field that can be programmed to non-zero values, in which case the upper order bits are permitted but not required to be hardwired to 0.<br>If the FPB BD Vector Supported bit is Clear, then it is permitted for hardware to implement this field as RO, and the value in this field is undefined.<br>Default value for this field is 0000b. |
| 18:7 | Reserved |
| 31:19 | FPB BD Vector Start-The value written by software to this field controls the offset within BD space at which the FPB BD Vector is applied.<br>The value represents a Bus/Device Number (bits [15:3] of an address in BDF Space), such that bit 0 of the FPB BD Vector represents the range starting from the value in this register up to that value plus the granularity minus 1 |

TABLE 3-continued

FPB BD Vector Control 1 Register

| Bit Location | Register Description |
|---|---|
| | and bit 1 represents range from this register value plus granularity up to that value plus granularity minus 1, etc. The Function Number offset (bits[2:0]) is fixed by hardware as 000b and cannot be modified. Software must program this field to a value that is naturally aligned according to the value in the FPB BD Vector Granularity Field as indicated here:<br>FPB BD Vector Granularity    Start Alignment Constraint<br>0000b                 <no constraint><br>0001b                 . . . 0b<br>0010b                 . . . 00b<br>0011b                 . . . 000b<br>0100b                 . . . 0000b<br>0101b                 . . . 00000b<br>If this requirement is violated, the hardware behavior is undefined.<br>If the FPB BD Vector Supported bit is Clear, then it is permitted for hardware to implement this field as RO, and the value in this field is undefined.<br>Default value for this field is 000h. |

Table 4 illustrates one example implementation of an FPB BD Vector Control 2 Register. In one example, the FPB BD Vector Control 2 Register can have an offset of 0Ch.

TABLE 4

FPB BD Vector Control 2 Register

| Bit Location | Register Description |
|---|---|
| 2:0 | Reserved |
| 15:3 | BD Secondary Start-The value written by software to this field controls the offset within BDF space at which Type 1 Configuration Requests passing downstream through the bridge must be converted to Type 0.<br>The value represents a Bus/Device Number (bits [15:3] of an address in BDF Space). The Function Number offset (bits[2:0]) is fixed by hardware as 000b and cannot be modified.<br>When the ARI Forwarding Enable bit in the Device Control 2 register is Set, then software must write bits 7:3 of this field to 00000b.<br>If the FPB BD Vector Supported bit is Clear, then it is permitted for hardware to implement this field as RO, and the value in this field is undefined.<br>Default value for this field is 000h. |
| 31:16 | Reserved |

Table 5 illustrates one example implementation of an FPB BD Vector Access Control Register. In one example, the FPB BD Vector Access Control Register can have an offset of 10h.

TABLE 5

FPB BD Vector Access Control Register

| Bit Location | Register Description |
|---|---|
| 7:0 | FPB BD Vector Access Offset-The value in this field indicates the offset of the 32b portion of the FPB BD Vector that can be read or written by means of the FPB BD Vector Access Data Register.<br>The bits of this field map to the offset according to the value in the FPB BD Vector Size Supported field as shown here:<br>            Offset Bits    This Field<br>000b     2:0             2:0 (7:3 unused)<br>001b     3:0             3:0 (7:4 unused)<br>010b     4:0             4:0 (7:5 unused) |

TABLE 5-continued

FPB BD Vector Access Control Register

| Bit Location | Register Description |
|---|---|
| | 011b     5:0             5:0 (7:6 unused)<br>100b     6:0             6:0 (7 unused)<br>101b     7:0             7:0<br>All other encodings are Reserved<br>Bits in this field that are unused per the table above must be written by software as 0b, and are permitted by not required to be implemented as RO.<br>If the FPB BD Vector Supported bit is Clear, then it is permitted for hardware to implement this field as RO, and the value in this field is undefined.<br>Default value for this field is 00h. |
| 31:8 | Reserved |

Table 6 illustrates one example implementation of an FPB BD Vector Access Data Register. In one example, the FPB BD Vector Access Data Register can have an offset of 14h.

TABLE 6

FPB BD Vector Access Data Register

| Bit Location | Register Description |
|---|---|
| 31:0 | FPB BD Vector Data-Reads from this register return the DW of data from the FPB BD Vector at the location determined by the value in the FPB BD Vector Access Offset Register. Writes to this register replace the DW of data from the FPB BD Vector at the location determined by the value in the FPB BD Vector Access Offset Register. If the FPB BD Vector Supported bit is Clear, then it is permitted for hardware to implement this field as RO, and the value in this field is undefined.<br>Default value for this field is 0000h |

Table 7 illustrates one example implementation of an FPB MEM Low Vector Control Register. In one example, the FPB MEM Low Vector Control Register can have an offset of 18h.

TABLE 7

FPB MEM Low Vector Control Register

| Bit Location | Register Description |
|---|---|
| 0 | FPB MEM Low Vector Enable-When Set, enables the FPB MEM Low Vector mechanism.<br>If the FPB MEM Low Vector Supported bit is Clear, then it is permitted for hardware to implement this field as RO, and in this case the value in this field is undefined.<br>Default value of this bit is 0b. |
| 3:1 | Reserved |
| 7:4 | FPB MEM Low Vector Granularity-The value written by software to this field controls the granularity of the FPB MEM Low Vector, and the required alignment of the FPB MEM Low Vector Start field (below).<br>Defined encodings are:<br>Value<br>Constraint     Granularity     Start Alignment<br>000b             1 MB             <no constraint><br>001b             2 MB             . . . 0b<br>010b             4 MB             . . . 00b<br>011b             8 MB             . . . 000b<br>100b             16 MB            . . . 0000b<br>All other encodings are Reserved<br>Based on the implemented FPB MEM Low Vector size, hardware is permitted to implement as RW only those bits of this field that can be programmed to non-zero values, in which case the upper order bits are permitted but not required to be hardwired to 0.<br>If the FPB MEM Low Vector Supported bit is Clear, then it is permitted for hardware to implement this field as RO, |

TABLE 7-continued

FPB MEM Low Vector Control Register

| Bit Location | Register Description |
|---|---|
|  | and the value in this field is undefined.<br>Default value for this field is 0000b. |
| 19:8 | Reserved |
| 31:20 | FPB MEM Low Vector Start-The value written by software to this field sets the base address at which the FPB MEM Low Vector is applied.<br>Software must program this field to a value that is naturally aligned according to the value in the FPB MEM Low Vector Granularity Field as indicated in the description for that field (above). If this requirement is violated, the hardware behavior is undefined.<br>If the FPB MEM Low Vector Supported bit is Clear, then it is permitted for hardware to implement this field as RO, and the value in this field is undefined.<br>Default value for this field is 0000h. |

Table 8 illustrates one example implementation of an FPB MEM Low Vector Access Control Register. In one example, the FPB MEM Low Vector Access Control Register can have an offset of 1Ch.

TABLE 8

FPB MEM Low Vector Access Control Register

| Bit Location | Register Description |
|---|---|
| 6:0 | FPB MEM Low Vector Access Offset-The value in this field indicates the offset of the 32b portion of the FPB MEM Low Vector that can be read or written by means of the FPB MEM Low Vector Access Data Register.<br>The bits of this field map to the offset according to the value in the FPB MEM Low Vector Granularity field as shown here:<br>　　　Offset Bits　　This Field<br>000b　　2:0　　　　2:0 (6:3 unused)<br>001b　　3:0　　　　3:0 (6:4 unused)<br>010b　　4:0　　　　4:0 (6:5 unused)<br>011b　　5:0　　　　5:0 (6 unused)<br>100b　　6:0　　　　6:0<br>Bits in this field that are unused per the table above must be written by software as 0b, and are permitted by not required to be implemented as RO.<br>If the FPB MEM Low Vector Supported bit is Clear, then it is permitted for hardware to implement this field as RO, and the value in this field is undefined.<br>Default value for this field is 00h |
| 31:7 | Reserved |

Table 9 illustrates one example implementation of an FPB MEM Low Vector Access Data Register. In one example, the FPB MEM Low Vector Access Data Register can have an offset of 20h.

TABLE 9

FPB MEM Low Vector Access Data Register

| Bit Location | Register Description |
|---|---|
| 31:0 | FPB MEM Low Vector Data-Reads from this register return the DW of data from the FPB MEM Low Vector at the location determinted by the value in the FPB MEM Low Vector Access Offset Register. Writes to this register replace the DW of data from the FPB MEM Low Vector at the location determinted by the value in the FPB MEM Low Vector Access Offset Register.<br>If the FPB MEM Low Vector Supported bit is Clear, then it is permitted for hardware to implement this field as RO, and the value in this field is undefined.<br>Default value for this field is 0000h |

Table 10 illustrates one example implementation of an FPB MEM High Vector Control 1 Register. In one example, the FPB MEM High Vector Control 1 Register can have an offset of 24h.

TABLE 10

FPB MEM High Vector Control 1 Register

| Bit Location | Register Description |
|---|---|
| 0 | FPB MEM High Vector Enable-When Set, enables the FPB MEM High Vector mechanism.<br>If the FPB MEM High Vector Supported bit is Clear, then it is permitted for hardware to implement this field as RO, and in this case the value in this field is undefined.<br>Default value of this bit is 0b. |
| 3:1 | Reserved |
| 7:4 | FPB MEM High Vector Granularity-The value written by software to this field controls the granularity of the FPB MEM High Vector, and the required alignment of the FPB MEM High Vector Start Lower field (below).<br>Software is permitted to select any allowed Granularity from the table below regardless of the value in the FPB MEM High Vector Size Supported field.<br>Defined encodings are:<br>Value<br>Constraint　　　Granularity　　Start Alignment<br>000b　　　　　　256 MB　　　　<no constraint><br>001b　　　　　　512 MB　　　　. . . 0b<br>010b　　　　　　1 GB　　　　　. . . 00b<br>011b　　　　　　2 GB　　　　　. . . 000b<br>100b　　　　　　4 GB　　　　　. . . 0000b<br>101b　　　　　　8 GB　　　　　. . . 00000b<br>110b　　　　　　16 GB　　　　. . . 000000b<br>111b　　　　　　32 GB　　　　. . . 0000000b<br>Based on the implemented FPB MEM High Vector size, hardware is permitted to implement as RW only those bits of this field that can be programmed to non-zero values, in which case the upper order bits are permitted but not required to be hardwired to 0.<br>If the FPB MEM High Vector Supported bit is Clear, then it is permitted for hardware to implement this field as RO, and the value in this field is undefined.<br>Default value for this field is 0000b. |
| 27:8 | Reserved |
| 31:28 | FPB MEM High Vector Start Lower-The value written by software to this field sets the lower bits of the base address at which the FPB MEM High Vector is applied.<br>Software must program this field to a value that is naturally aligned (i.e., the lower order bits are 0's) according to the value in the FPB MEM High Vector Granularity Field as indicated here:<br>FPB MEM High Vector Granularity Constraint<br>0000b　　　　　　<no constraint><br>0001b　　　　　　. . . 0b<br>0010b　　　　　　. . . 00b<br>0011b　　　　　　. . . 000b<br>0100b　　　　　　. . . 0000b<br>0101b　　　　　　. . . 00000b<br>0110b　　　　　　. . . 000000b<br>0111b　　　　　　. . . 0000000b<br>If this requirement is violated, the hardware behavior is undefined.<br>If the FPB MEM High Vector Supported bit is Clear, then it is permitted for hardware to implement this field as RO, and the value in this field is undefined.<br>Default value for this field is 00h. |

Table 11 illustrates one example implementation of an FPB MEM High Vector Control 2 Register. In one example, the FPB MEM High Vector Control 2 Register can have an offset of 28h.

TABLE 11

FPB MEM High Vector Control 2 Register

| Bit Location | Register Description |
|---|---|
| 31:0 | FPB MEM High Vector Start Upper-The value written by software to this field indicates bits 63:32 of the base address at which the FPB MEM High Vector is applied. If the FPB MEM High Vector Supported bit is Clear, then it is permitted for hardware to implement this field as RO, and the value in this field is undefined. Default value for this field is 00000000h. |

Table 12 illustrates one example implementation of an FPB MEM High Vector Access Control Register. In one example, the FPB MEM High Vector Access Control Register can have an offset of 2Ch.

TABLE 12

FPB MEM High Vector Access Control Register

| Bit Location | Register Description |
|---|---|
| 7:0 | FPB MEM High Vector Access Offset-The value in this field indicates the offset of the 32b portion of the FPB BD, MEM Low or MEM High Vector that can be read or written by means of the FPB MEM High Vector Access Data Register.<br>The bits of this field map to the offset according to the value in the FPB MEM High Vector Granularity field as shown here:<br>    Offset Bits    This Field<br>    000b    2:0    2:0 (7:3 unused)<br>    001b    3:0    3:0 (7:4 unused)<br>    010b    4:0    4:0 (7:5 unused)<br>    011b    5:0    5:0 (7:6 unused)<br>    100b    6:0    6:0 (7 unused)<br>    101b    7:0    7:0<br>Bits in this field that are unused per the table above must be written by software as 0b, and are permitted by not required to be implemented as RO.<br>If the FPB MEM High Vector Supported bit is Clear, then it is permitted for hardware to implement this field as RO, and the value in this field is undefined.<br>Default value for this field is 00h |
| 13:8 | Reserved |
| 15:14 | FPB Vector Select-The value written to this field selects the Vector to be accessed at the indicated FPB Vector Access Offset, encoded as:<br>00: BD<br>01: MEM Low<br>10: MEM High<br>11: Reserved<br>Default value for this field may be 00b |
| 31:16 | Reserved |

Table 13 illustrates one example implementation of an FPB MEM High Vector Access Data Register. In one example, the FPB MEM High Vector Access Data Register can have an offset of 30h.

TABLE 13

FPB MEM High Vector Access Data Register

| Bit Location | Register Description |
|---|---|
| 31:0 | FPB MEM High Vector Data-Reads from this register return the DW of data from the FPB MEM High Vector at the location determined by the value in the FPB MEM High Vector Access Offset Register. Writes to this register replace the DW of data from the FPB MEM High Vector at the location determined by the value in the FPB MEM High Vector Access Offset Register.<br>If the FPB MEM High Vector Supported bit is Clear, then it is permitted for hardware to implement this field |

TABLE 13-continued

FPB MEM High Vector Access Data Register

| Bit Location | Register Description |
|---|---|
| | as RO, and the value in this field is undefined. Default value for this field is 0000h |

In an alternate implementation, rather than providing separate Vector Access Offset and Vector Data registers for each vector, a single Vector Access Offset register can be used with the addition of a field to indicate which vector is to be accessed, and a single Vector Data register can be used to perform the read or write operations to the indicated vector. In such an implementation, the indicator field can be implemented as a two bit field encoded such that a value of 00 (binary) can indicate an access to the BD Vector, a value of 01 (binary) can indicate an access to the MEM Low Vector, a value of 10 (binary) can indicate an access to the MEM High Vector, and a value of 11 (binary) can indicate a reserved value.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 11:
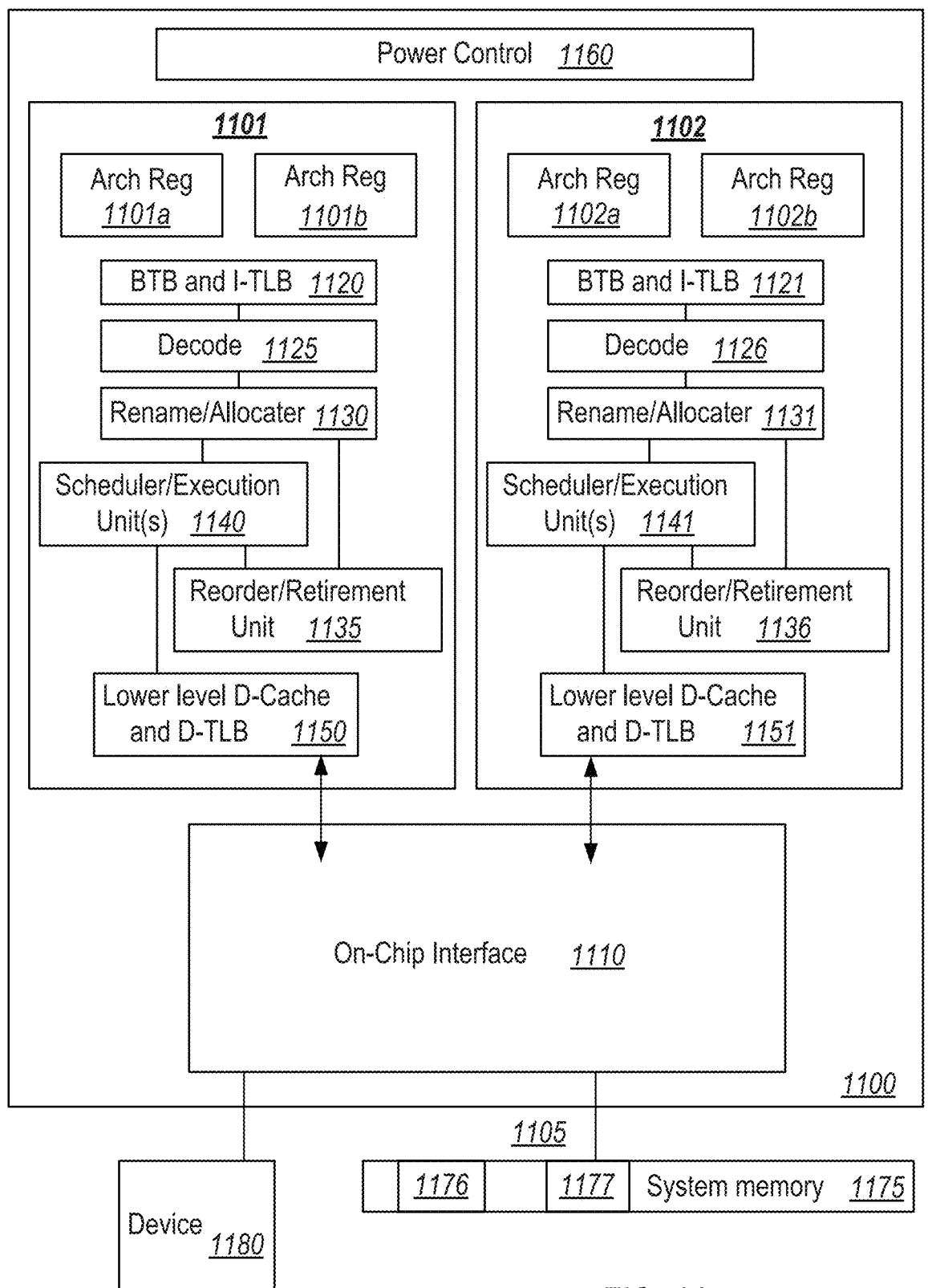
FIG. 11 illustrates an embodiment of a block diagram for a computing system including a multicore processor.

Referring to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores—core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1001a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache—a type of instruction cache—instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 1110 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12:
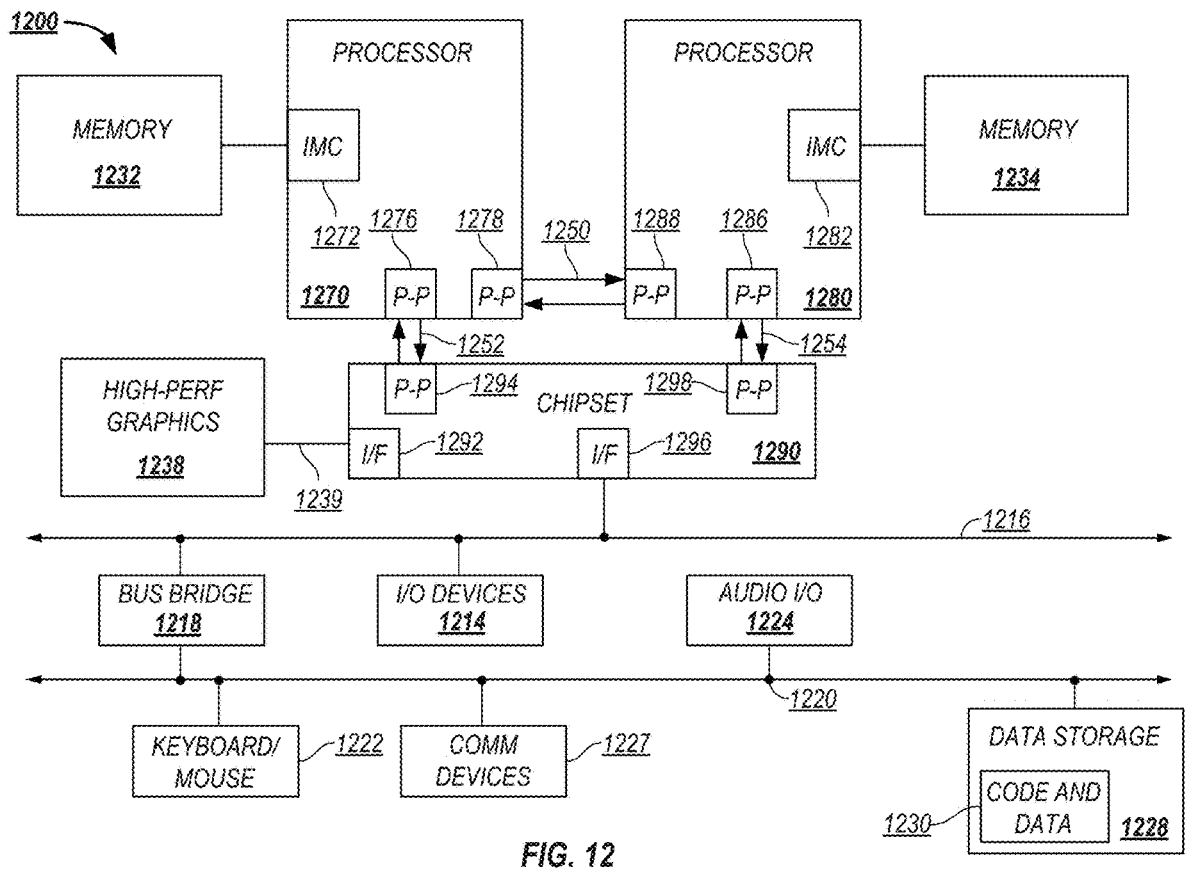
FIG. 12 illustrates another embodiment of a block diagram for a computing system.

Referring now to FIG. 12, shown is a block diagram of a second system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the invention may be implemented within the QPI architecture.

While shown with only two processors 1270, 1280, it is to be understood that the scope of the present invention is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

Aspects of the embodiments can include one or a combination of the following examples:

Example 1 is a system, method, apparatus, or storage medium with instructions stored thereon executable to cause a machine to identify a plurality of devices in a system and assign a respective address to each of the plurality of devices. Each device in the plurality of devices is connected in the system by at least a respective one of a plurality of buses, and assigning the address to a device includes determining whether to assign the address according to a first addressing scheme or a second bus addressing scheme, where the first addressing scheme assigns a unique bus number within a Bus/Device/Function (BDF) address space to each device addressed in the first addressing scheme and the second bus addressing scheme assigns a unique bus-device number within the BDF address space.

Example 2 may include the subject matter of example 1, where a particular Bus number is reused to address two or more devices in the second addressing scheme.

Example 3 may include the subject matter of any one of examples 1-2, where assigning the addresses includes designating a range of bus numbers in the BDF address space to be used to address devices according to the second addressing scheme.

Example 4 may include the subject matter of example 3, where the range of bus numbers is associated with a particular switch and the bus numbers in the range of bus numbers are used in the bus-device numbers to be assigned to each device connected to the switch.

Example 5 may include the subject matter of example 4, where the devices connected to the switch include a segment.

Example 6 may include the subject matter of any one of examples 1-5, where the addresses include configuration addresses.

Example 7 may include the subject matter of any one of examples 1-6, where the BDF address space includes a Peripheral Component Interconnect (PCI)-based address space.

Example 8 may include the subject matter of example 7, where each bus-device number includes an eight bit bus number and a five bit device number.

Example 9 is an apparatus including a port to receive a particular packet, where the port includes a flattening portal bridge (FPB), the FPB includes a primary side and a secondary side, the primary side connects to a first set of devices addressed according to a first addressing scheme, and the secondary side connects to a second set of devices addressed according to a second addressing scheme. The FPB is further to determine whether to route the particular packet on the primary side or the secondary side based on address information in the particular packet, the first addressing scheme uses a unique bus number within a Bus/Device/Function (BDF) address space for each device in the first set of devices, and the second bus addressing scheme uses a unique bus-device number for each device in the second set of devices.

Example 10 may include the subject matter of example 9, where the respective bus-device numbers assigned to a plurality of devices in the second set of devices each include a particular bus number and a different device number.

Example 11 may include the subject matter of any one of examples 9-10, where the primary addressing scheme includes a legacy addressing scheme.

Example 12 may include the subject matter of any one of examples 9-11, where the BDF addressing space includes a Peripheral Component Interconnect Express (PCIe) configuration space.

Example 13 may include the subject matter of any one of examples 9-12, further including a plurality of ports, where the port includes a particular one of the plurality of ports, and at least one other port in the plurality of ports includes an FPB.

Example 14 may include the subject matter of example 13, where the plurality of ports include at least one port without an FPB.

Example 15 may include the subject matter of example 13, further including a switch, where the switch includes the plurality of ports.

Example 16 may include the subject matter of example 13, further including a root complex, where the root complex includes the plurality of ports.

Example 17 may include the subject matter of any one of examples 9-16, further including a BD Control 1 register.

Example 18 may include the subject matter of any one of examples 9-17, further including a BD Vector Control 2 Register.

Example 19 may include the subject matter of any one of examples 9-18, further including a BD Vector Access Control Register.

Example 20 may include the subject matter of any one of examples 9-19, further including a BD Vector Access Data Register.

Example 21 may include the subject matter of any one of examples 9-20, further including a MEM Low Vector Control Register.

Example 22 may include the subject matter of any one of examples 9-21, further including a MEM Low Vector Access Control Register.

Example 23 may include the subject matter of any one of examples 9-22, further including a MEM Low Vector Access Data Register.

Example 24 may include the subject matter of any one of examples 9-23, further including a MEM High Vector Control 1 Register.

Example 25 may include the subject matter of any one of examples 9-24, further including a MEM High Vector Control 2 Register.

Example 26 may include the subject matter of any one of examples 9-25, further including a MEM High Vector Access Control Register.

Example 27 may include the subject matter of any one of examples 9-26, further including a MEM High Vector Access Data Register.

Example 28 is a storage medium having instructions stored thereon, the instructions when executed on a machine, cause the machine to configure registers of a device to support a primary bus address scheme in a Bus/Device/Function (BDF) space and an alternate bus addressing scheme that uses the same bus number within a or memory mapped input/output (I/O) (MMIO) space in enumerating a plurality of different buses of a system.

Example 29 may include the subject of example 28, where the instructions are further executable to constrain a permissible range of BD to be assigned to a Secondary Side of a Root Port bridge.

Example 30 is a system including a switch device, a hierarchy of devices connected to the switch device, a set of one or more other devices connected to the switch device, where the set of one or more other devices is addressed according to a first addressing scheme, the hierarchy of devices is addressed according to second addressing scheme, the first addressing scheme uses a unique bus number within a Bus/Device/Function (BDF) address space for each device in the first set of devices, and the second addressing scheme uses a unique bus-device number for each device in the second set of devices.

Example 31 may include the subject of example 30, where the switch device includes a first port to connect to the hierarchy of devices, and the first port includes bridge logic to determine whether to route a particular packet on a primary side of the bridge utilizing the first addressing scheme or a secondary side of the bridge utilizing the second addressing scheme.

Example 32 may include the subject matter of any one of examples 30-31, further including a capability register to be encoded to selectively enable support for the secondary addressing scheme on a particular port of the switch.

Example 33 may include the subject matter of any one of examples, 30-32 where the switch device includes a root complex A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. At least one machine accessible storage medium having instructions stored thereon, the instructions when executed on a machine, cause the machine to:
   identify a plurality of devices in a system, wherein each device in the plurality of devices is connected in the system by at least a respective one of a plurality of logical buses;
   assign a respective address to each of the plurality of devices, wherein assigning the address to a device comprises:
      determining whether to assign the address according to a first addressing scheme or a second bus addressing scheme, wherein the first addressing scheme assigns a unique bus number within a Bus/Device/Function (BDF) address space to each device addressed in the first addressing scheme and the second bus addressing scheme assigns a unique bus-device number within the BDF address space.

2. The storage medium of claim 1, wherein a particular Bus number is reused to address two or more devices in the second addressing scheme.

3. The storage medium of claim 1, wherein assigning the addresses comprises designating a range of bus numbers in the BDF address space to be used to address devices according to the second addressing scheme.

4. The storage medium of claim 3, wherein the range of bus numbers is associated with a particular switch and the bus numbers in the range of bus numbers are used in the bus-device numbers to be assigned to each device connected to the switch.

5. The storage medium of claim 4, wherein the devices connected to the switch comprise a segment.

6. The storage medium of claim 1, wherein the addresses comprise configuration addresses.

7. The storage medium of claim 1, wherein the BDF address space comprises a Peripheral Component Interconnect (PCI)-based address space.

8. The storage medium of claim 7, wherein each bus-device number comprises an eight bit bus number and a five bit device number.

9. An apparatus comprising:
a port to receive a particular packet, wherein the port comprises a flattening portal bridge (FPB), the FPB comprises a primary side and a secondary side, the primary side connects to a first set of devices addressed according to a first addressing scheme, and the secondary side connects to a second set of devices addressed according to a second addressing scheme;
wherein the FPB is further to determine whether to route the particular packet on the primary side or the secondary side based on address information in the particular packet, the first addressing scheme uses a unique bus number within a Bus/Device/Function (BDF) address space for each device in the first set of devices, and the second bus addressing scheme uses a unique bus-device number in the BDF space for each device in the second set of devices.

10. The apparatus of claim 9, wherein the respective bus-device numbers assigned to a plurality of devices in the second set of devices each comprise a particular bus number and a different device number.

11. The apparatus of claim 9, wherein the primary addressing scheme comprises a legacy addressing scheme.

12. The apparatus of claim 9, wherein the BDF addressing space comprises a Peripheral Component Interconnect Express (PCIe) configuration space.

13. The apparatus of claim 9, further comprising a plurality of ports, wherein the port comprises a particular one of the plurality of ports, and at least one other port in the plurality of ports comprises an FPB.

14. The apparatus of claim 13, wherein the plurality of ports comprise at least one port without an FPB.

15. The apparatus of claim 13, further comprising a switch, wherein the switch comprises the plurality of ports.

16. The apparatus of claim 13, further comprising a root complex, wherein the root complex comprises the plurality of ports.

17. A system comprising:
a switch device;
a hierarchy of devices connected to the switch device;
a set of one or more other devices connected to the switch device;
wherein the set of one or more other devices is addressed according to a first addressing scheme, the hierarchy of devices is addressed according to second addressing scheme, the first addressing scheme uses a unique bus number within a Bus/Device/Function (BDF) address space for each device in the first set of devices, and the second addressing scheme uses a unique bus-device number in the BDF address space for each device in the second set of devices.

18. The system of claim 17, wherein the switch device comprises a first port to connect to the hierarchy of devices, and the first port comprises bridge logic to determine whether to route a particular packet on a primary side of the bridge utilizing the first addressing scheme or a secondary side of the bridge utilizing the second addressing scheme.

19. The system of claim 17, further comprising a capability register to be encoded to selectively enable support for the secondary addressing scheme on a particular port of the switch.

20. The system of claim 17, wherein the switch device comprises a root complex.

\* \* \* \* \*